US008910153B2

(12) United States Patent
Gupta et al.

(10) Patent No.: US 8,910,153 B2
(45) Date of Patent: Dec. 9, 2014

(54) MANAGING VIRTUALIZED ACCELERATORS USING ADMISSION CONTROL, LOAD BALANCING AND SCHEDULING

(75) Inventors: Vishakha Gupta, Atlanta, GA (US); Niraj Tolia, Mountain View, CA (US); Vanish Talwar, Palo Alto, CA (US); Partha Ranganathan, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 911 days.

(21) Appl. No.: 12/502,074

(22) Filed: Jul. 13, 2009

(65) Prior Publication Data

US 2011/0010721 A1 Jan. 13, 2011

(51) Int. Cl.
*G06F 9/46* (2006.01)
*G06F 9/455* (2006.01)
*G06F 9/50* (2006.01)

(52) U.S. Cl.
CPC .............. *G06F 9/5077* (2013.01); *G06F 9/455* (2013.01)
USPC ................................ 718/1; 718/104; 718/105

(58) Field of Classification Search
USPC .............................................................. 718/1
See application file for complete search history.

(56) References Cited

U.S. PATENT DOCUMENTS 7,673,113 B2 * 3/2010 Sugumar et al. .............. 711/170
7,779,424 B2 * 8/2010 Cherkasova et al. .......... 719/321
7,849,286 B2 * 12/2010 Sugumar et al. .............. 711/173
8,078,824 B2 * 12/2011 Sugumar et al. .............. 711/170
8,127,291 B2 * 2/2012 Pike et al. ......................... 718/1
8,291,148 B1 * 10/2012 Shah et al. .................... 710/316
8,341,624 B1 * 12/2012 Hobbs ............................... 718/1
2006/0069761 A1 * 3/2006 Singh et al. ................... 709/222
2006/0200821 A1 * 9/2006 Cherkasova et al. .............. 718/1
2006/0277295 A1 * 12/2006 Masuda et al. ................ 709/224
2007/0011272 A1 * 1/2007 Bakke et al. ................. 709/217
2007/0043860 A1 * 2/2007 Pabari .......................... 709/224
2007/0192518 A1 * 8/2007 Rupanagunta et al. ......... 710/62
2008/0028397 A1 * 1/2008 Gupta et al. ...................... 718/1
2008/0028399 A1 * 1/2008 Gupta et al. ...................... 718/1
2008/0028411 A1 * 1/2008 Cherkasova et al. .......... 718/104
2008/0163239 A1 * 7/2008 Sugumar et al. .............. 718/105
2008/0189700 A1 * 8/2008 Schmidt et al. ................... 718/1
2008/0222633 A1 * 9/2008 Kami ............................... 718/1
2009/0119664 A1 * 5/2009 Pike et al. ......................... 718/1

(Continued)

OTHER PUBLICATIONS

Gupta et al, "GVIM: GPU-Accelerated Virtual Machines", ACM Mar. 2009, pp. 17-24.*

(Continued)

*Primary Examiner* — Abdullah Al Kawsar

(57) ABSTRACT

A system and method is shown that includes an admission control module that resides in a management/driver domain, the admission control module to admit a domain that is part of a plurality of domains, into the computer system based upon one of a plurality of accelerators satisfying a resource request of the domain. The system and method also includes a load balancer module, which resides in the management/driver domain, the load balancer to balance at least one load from the plurality of domains across the plurality of accelerators. Further, the system and method also includes a scheduler module that resides in the management/driver domain, the scheduler to multiplex multiple requests from the plurality of domains to one of the plurality of accelerators.

13 Claims, 21 Drawing Sheets

(56) References Cited

U.S. PATENT DOCUMENTS

| | | | | |
|---|---|---|---|---|
| 2009/0210527 | A1* | 8/2009 | Kawato | 709/224 |
| 2010/0050172 | A1* | 2/2010 | Ferris | 718/1 |
| 2010/0125845 | A1* | 5/2010 | Sugumar et al. | 718/1 |
| 2010/0186010 | A1* | 7/2010 | Chalemin et al. | 718/1 |
| 2010/0269109 | A1* | 10/2010 | Cartales | 718/1 |
| 2010/0281478 | A1* | 11/2010 | Sauls et al. | 718/1 |
| 2010/0332657 | A1* | 12/2010 | Elyashev et al. | 709/226 |
| 2011/0035754 | A1* | 2/2011 | Srinivasan | 718/105 |
| 2011/0119670 | A1* | 5/2011 | Sugumar et al. | 718/1 |

OTHER PUBLICATIONS

Gavrilovska et al, "High-Performance Hypervisor Architectures Virtualization in HPC Systems", ACM Mar. 2007, pp. 1-8.*

Diamos et al, "Virtualizing Heterogeneous May-Core Platforms", Eurosys 2007 Poster, Lisbon, Portugal, Mar. 2007.*

* cited by examiner

102
MANAGEMENT/
DRIVER DOMAIN
206
ACCELERATOR
BACKEND
209
MGMT
EXTENSION
210
DEVICE
DRIVERS
211
VM
207
APPLICATIONS
212
ACCELERATOR API
213
ACCELERATOR
FRONTEND
214
VM
208
APPLICATIONS
215
ACCELERATOR API
216
ACCELERATOR
FRONTEND
217
HYPERVISOR
205
PHYSICAL
LAYER
201
GENERAL PURPOSE CORES
202
INTERCONNECT
203
ACCELERATORS
204
N
N

400
MANAGEMENT/DRIVER DOMAIN
206
MGMT EXTENSION
210
SLAs
401
ADMISSION CONTROL
402
416
ACCELERATOR QUEUES
404
TRANSLATED SLA
403
PER-DOMAIN REQUEST QUEUES
405
POLLER
407
MONITOR
409
415
MANAGEMENT/DRIVER DOMAIN SCHEDULER
408
LOAD BALANCING ACROSS ACCELERATORS
406
ACC 1
ACC N
414
RUNTIME FEEDBACK
412
SCHEDULE
410
DEBIT
HYPERVISOR SCHEDULER
411
413
CORE 1
CORE N
205
HYPERVISOR 500
502
LOAD BALANCER MODULE
505
504
ADMISSION CONTROL MODULE
CPU
501
SCHEDULER MODULE
503

600
601
603
ADMISSION CONTROL MODULE
MANAGEMENT/DRIVER DOMAIN SCHEDULER
607
606
POLLER MODULE
CPU
604
LOAD BALANCER MODULE
MONITOR MODULE
602
605

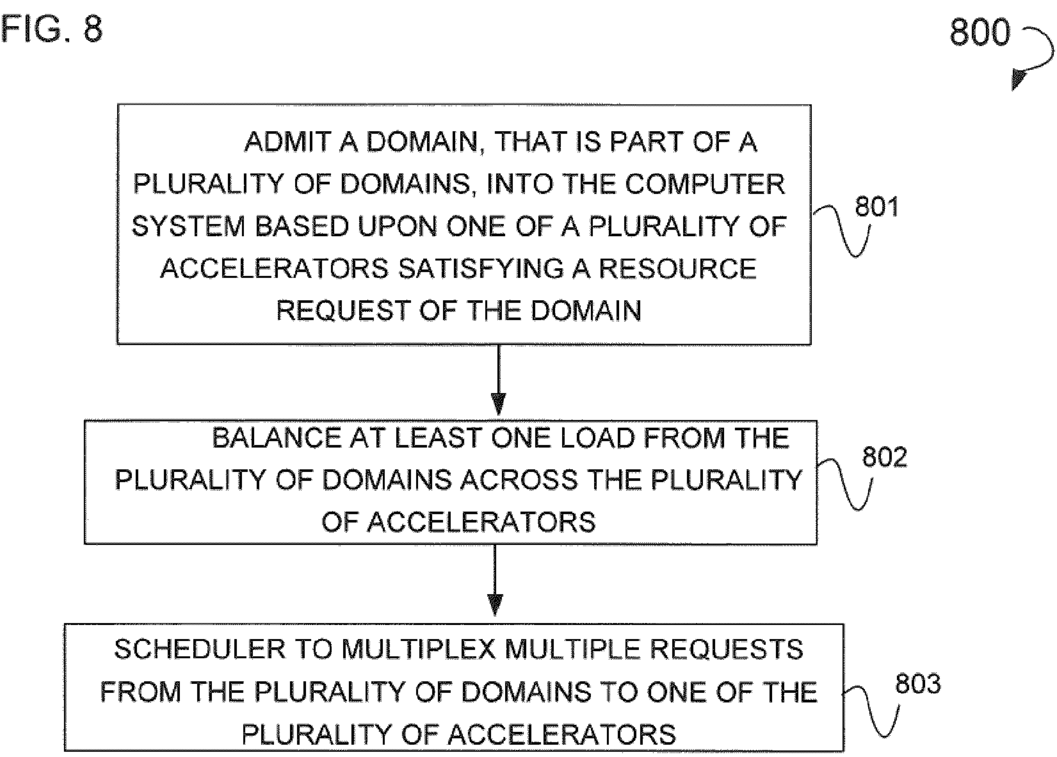
FIG. 8
800
ADMIT A DOMAIN, THAT IS PART OF A PLURALITY OF DOMAINS, INTO THE COMPUTER SYSTEM BASED UPON ONE OF A PLURALITY OF ACCELERATORS SATISFYING A RESOURCE REQUEST OF THE DOMAIN
801
BALANCE AT LEAST ONE LOAD FROM THE PLURALITY OF DOMAINS ACROSS THE PLURALITY OF ACCELERATORS
802
SCHEDULER TO MULTIPLEX MULTIPLE REQUESTS FROM THE PLURALITY OF DOMAINS TO ONE OF THE PLURALITY OF ACCELERATORS
803

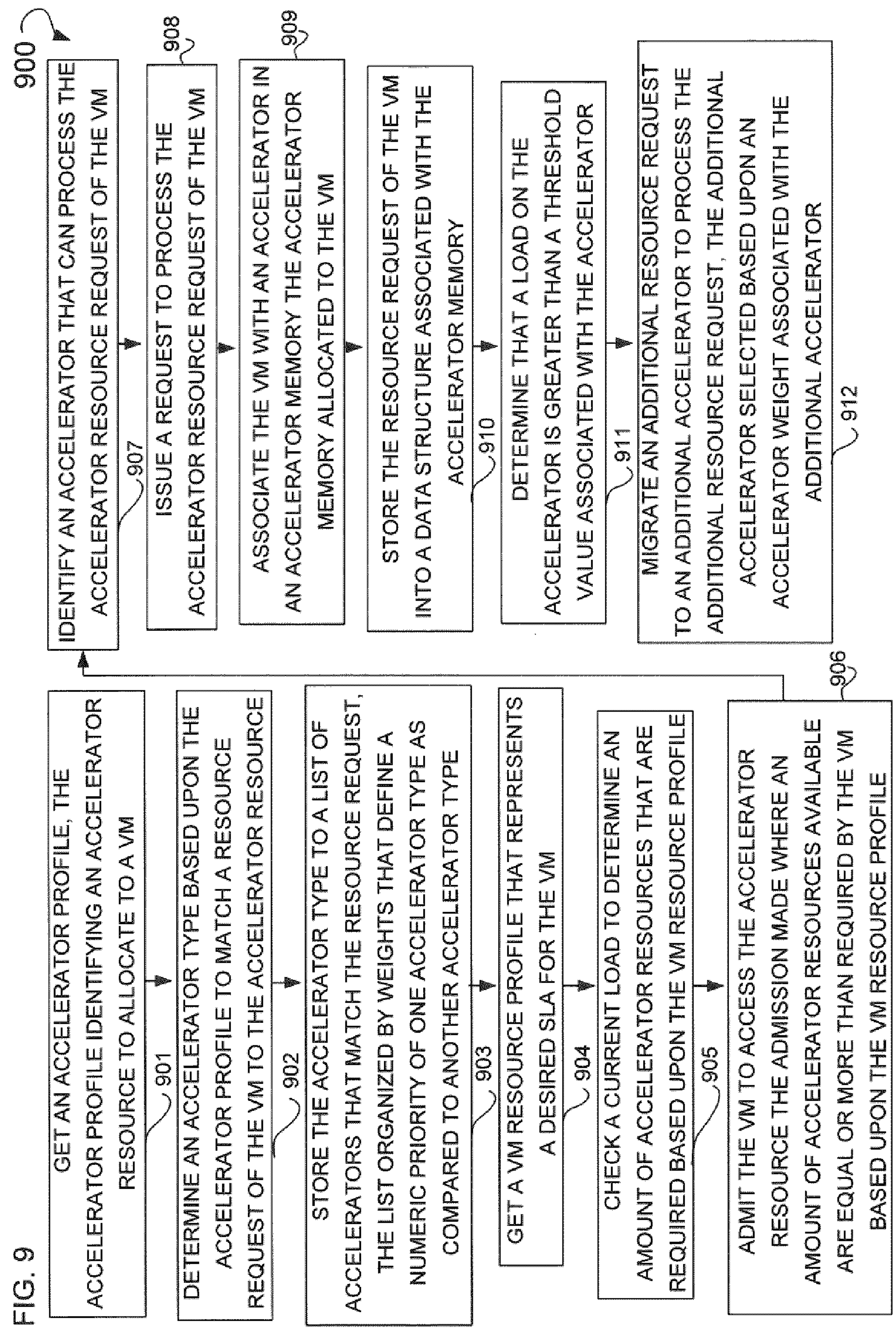
FIG. 9
900
GET AN ACCELERATOR PROFILE, THE ACCELERATOR PROFILE IDENTIFYING AN ACCELERATOR RESOURCE TO ALLOCATE TO A VM
901
DETERMINE AN ACCELERATOR TYPE BASED UPON THE ACCELERATOR PROFILE TO MATCH A RESOURCE REQUEST OF THE VM TO THE ACCELERATOR RESOURCE
902
STORE THE ACCELERATOR TYPE TO A LIST OF ACCELERATORS THAT MATCH THE RESOURCE REQUEST, THE LIST ORGANIZED BY WEIGHTS THAT DEFINE A NUMERIC PRIORITY OF ONE ACCELERATOR TYPE AS COMPARED TO ANOTHER ACCELERATOR TYPE
903
GET A VM RESOURCE PROFILE THAT REPRESENTS A DESIRED SLA FOR THE VM
904
CHECK A CURRENT LOAD TO DETERMINE AN AMOUNT OF ACCELERATOR RESOURCES THAT ARE REQUIRED BASED UPON THE VM RESOURCE PROFILE
905
ADMIT THE VM TO ACCESS THE ACCELERATOR RESOURCE THE ADMISSION MADE WHERE AN AMOUNT OF ACCELERATOR RESOURCES AVAILABLE ARE EQUAL OR MORE THAN REQUIRED BY THE VM BASED UPON THE VM RESOURCE PROFILE
906
IDENTIFY AN ACCELERATOR THAT CAN PROCESS THE ACCELERATOR RESOURCE REQUEST OF THE VM
907
ISSUE A REQUEST TO PROCESS THE ACCELERATOR RESOURCE REQUEST OF THE VM
908
ASSOCIATE THE VM WITH AN ACCELERATOR IN AN ACCELERATOR MEMORY THE ACCELERATOR MEMORY ALLOCATED TO THE VM
909
STORE THE RESOURCE REQUEST OF THE VM INTO A DATA STRUCTURE ASSOCIATED WITH THE ACCELERATOR MEMORY
910
DETERMINE THAT A LOAD ON THE ACCELERATOR IS GREATER THAN A THRESHOLD VALUE ASSOCIATED WITH THE ACCELERATOR
911
MIGRATE AN ADDITIONAL RESOURCE REQUEST TO AN ADDITIONAL ACCELERATOR TO PROCESS THE ADDITIONAL RESOURCE REQUEST, THE ADDITIONAL ACCELERATOR SELECTED BASED UPON AN ACCELERATOR WEIGHT ASSOCIATED WITH THE ADDITIONAL ACCELERATOR
912

1000
1001
RECEIVE A RESOURCE REQUEST, WHICH IDENTIFIES ACCELERATOR RESOURCES TO BE UTILIZED BY A DOMAIN
1002
RETRIEVE A SCHEDULING POLICY, THE SCHEDULING POLICY TO DICTATE A USE OF THE ACCELERATOR RESOURCES BY THE DOMAIN

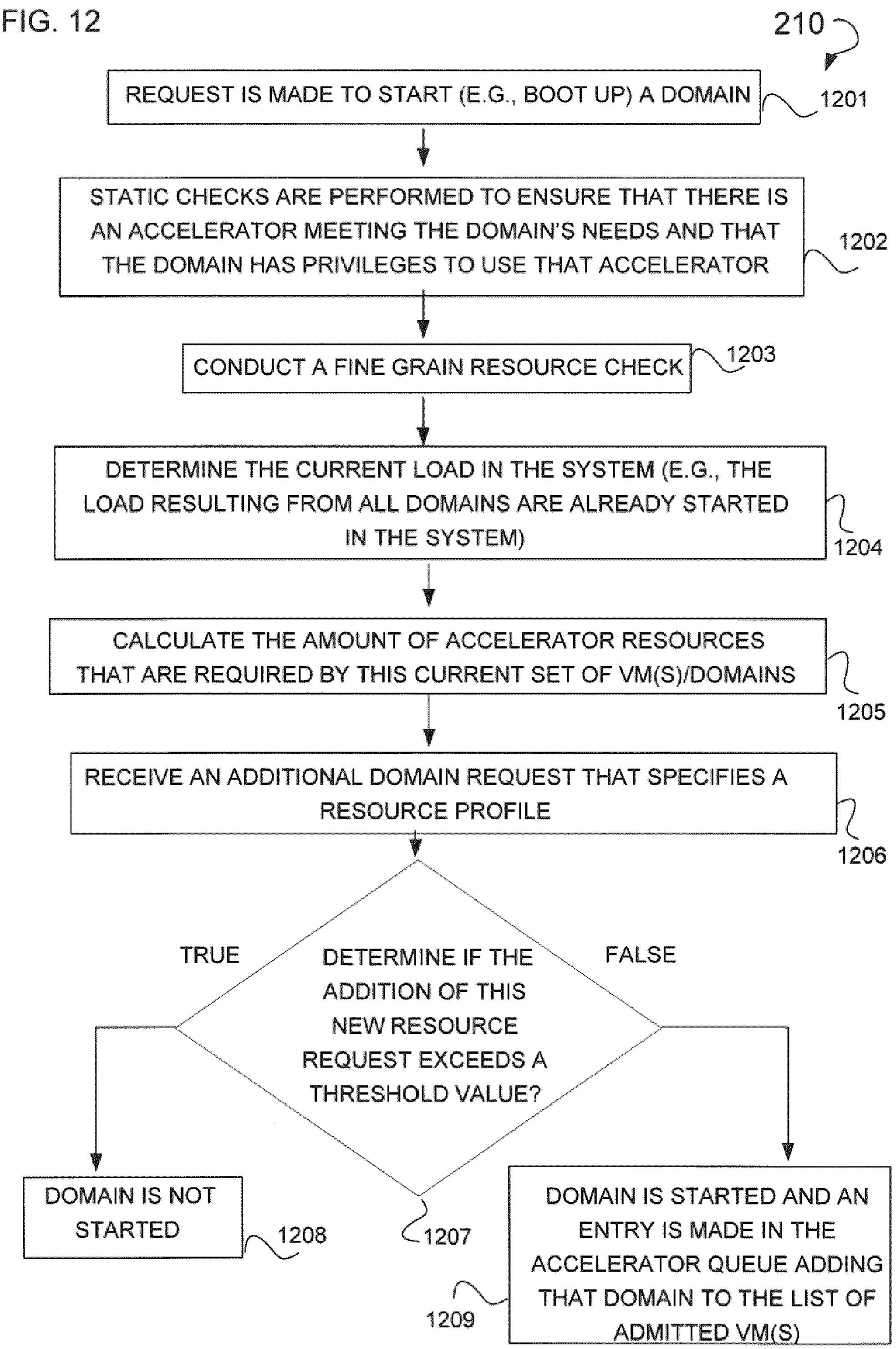
FIG. 12
210
REQUEST IS MADE TO START (E.G., BOOT UP) A DOMAIN
1201
STATIC CHECKS ARE PERFORMED TO ENSURE THAT THERE IS AN ACCELERATOR MEETING THE DOMAIN'S NEEDS AND THAT THE DOMAIN HAS PRIVILEGES TO USE THAT ACCELERATOR
1202
CONDUCT A FINE GRAIN RESOURCE CHECK
1203
DETERMINE THE CURRENT LOAD IN THE SYSTEM (E.G., THE LOAD RESULTING FROM ALL DOMAINS ARE ALREADY STARTED IN THE SYSTEM)
1204
CALCULATE THE AMOUNT OF ACCELERATOR RESOURCES THAT ARE REQUIRED BY THIS CURRENT SET OF VM(S)/DOMAINS
1205
RECEIVE AN ADDITIONAL DOMAIN REQUEST THAT SPECIFIES A RESOURCE PROFILE
1206
TRUE
DETERMINE IF THE ADDITION OF THIS NEW RESOURCE REQUEST EXCEEDS A THRESHOLD VALUE?
FALSE
DOMAIN IS NOT STARTED
1208
1207
DOMAIN IS STARTED AND AN ENTRY IS MADE IN THE ACCELERATOR QUEUE ADDING THAT DOMAIN TO THE LIST OF ADMITTED VM(S)
1209

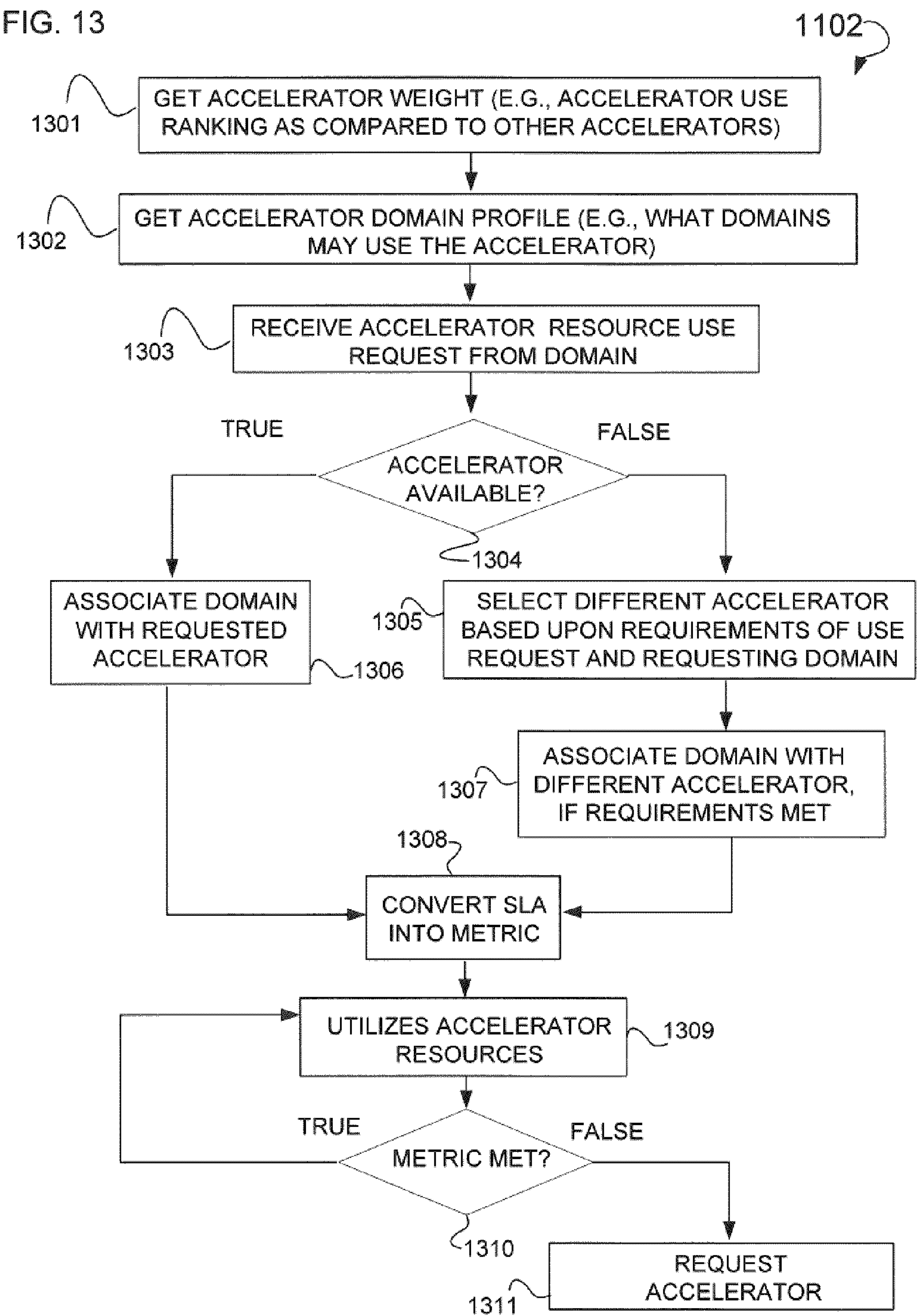
FIG. 13
1102
1301
GET ACCELERATOR WEIGHT (E.G., ACCELERATOR USE RANKING AS COMPARED TO OTHER ACCELERATORS)
1302
GET ACCELERATOR DOMAIN PROFILE (E.G., WHAT DOMAINS MAY USE THE ACCELERATOR)
1303
RECEIVE ACCELERATOR RESOURCE USE REQUEST FROM DOMAIN
TRUE
FALSE
ACCELERATOR AVAILABLE?
1304
ASSOCIATE DOMAIN WITH REQUESTED ACCELERATOR
1306
1305
SELECT DIFFERENT ACCELERATOR BASED UPON REQUIREMENTS OF USE REQUEST AND REQUESTING DOMAIN
1307
ASSOCIATE DOMAIN WITH DIFFERENT ACCELERATOR, IF REQUIREMENTS MET
1308
CONVERT SLA INTO METRIC
UTILIZES ACCELERATOR RESOURCES
1309
TRUE
FALSE
METRIC MET?
1310
1311
REQUEST ACCELERATOR

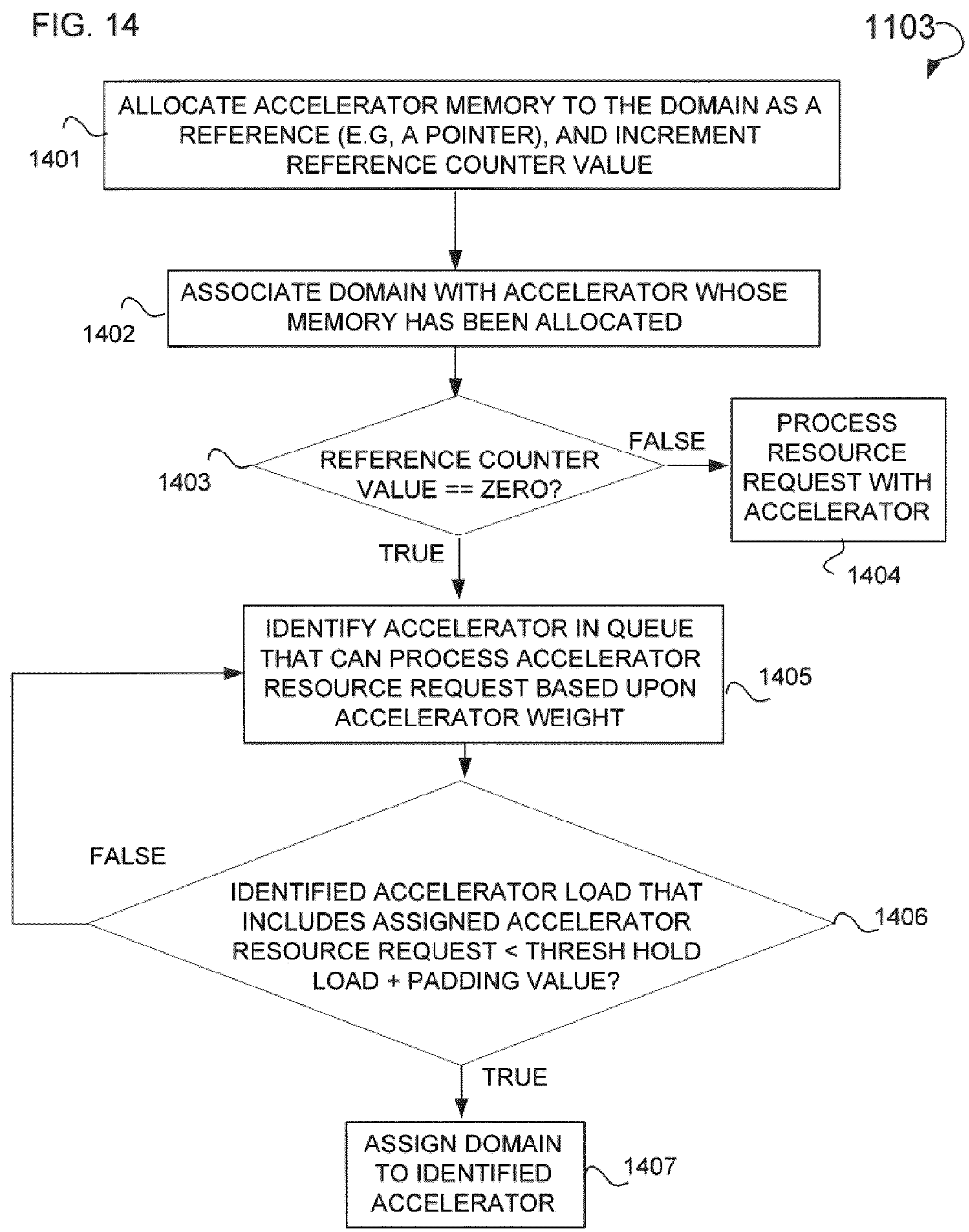
FIG. 14
1103
ALLOCATE ACCELERATOR MEMORY TO THE DOMAIN AS A REFERENCE (E.G, A POINTER), AND INCREMENT REFERENCE COUNTER VALUE
1401
ASSOCIATE DOMAIN WITH ACCELERATOR WHOSE MEMORY HAS BEEN ALLOCATED
1402
REFERENCE COUNTER VALUE == ZERO?
1403
FALSE
PROCESS RESOURCE REQUEST WITH ACCELERATOR
1404
TRUE
IDENTIFY ACCELERATOR IN QUEUE THAT CAN PROCESS ACCELERATOR RESOURCE REQUEST BASED UPON ACCELERATOR WEIGHT
1405
FALSE
IDENTIFIED ACCELERATOR LOAD THAT INCLUDES ASSIGNED ACCELERATOR RESOURCE REQUEST < THRESH HOLD LOAD + PADDING VALUE?
1406
TRUE
ASSIGN DOMAIN TO IDENTIFIED ACCELERATOR
1407

1104
MONITOR VM PER DOMAIN REQUEST QUEUE FOR A ACCELERATOR RESOURCE REQUEST FROM A DOMAIN
1601
FALSE
REQUEST IDENTIFIED?
1602
TRUE
PROCESS REQUEST FOR EXECUTION BY ACCELERATOR
1603

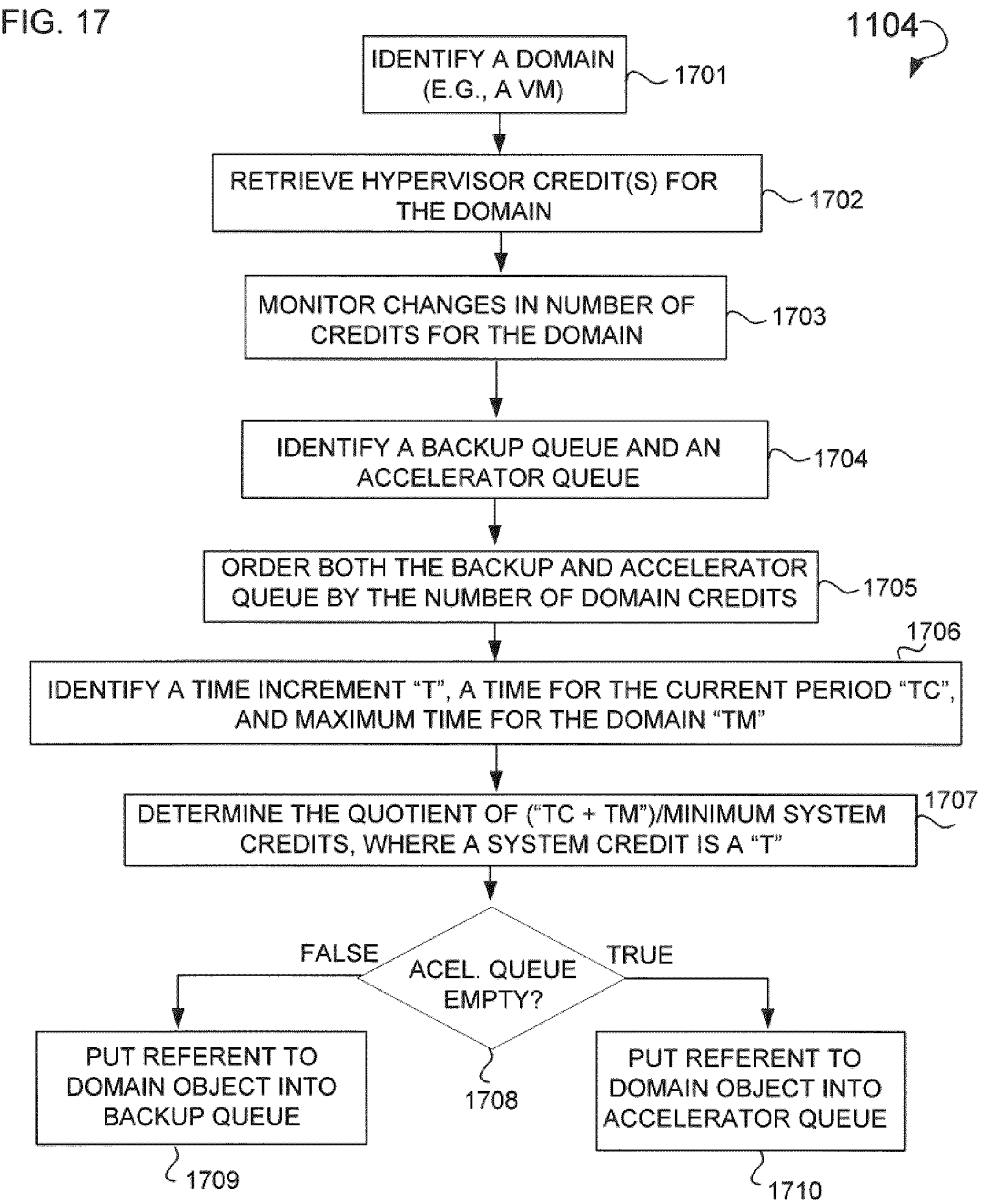
FIG. 17
1104
IDENTIFY A DOMAIN (E.G., A VM)
1701
RETRIEVE HYPERVISOR CREDIT(S) FOR THE DOMAIN
1702
MONITOR CHANGES IN NUMBER OF CREDITS FOR THE DOMAIN
1703
IDENTIFY A BACKUP QUEUE AND AN ACCELERATOR QUEUE
1704
ORDER BOTH THE BACKUP AND ACCELERATOR QUEUE BY THE NUMBER OF DOMAIN CREDITS
1705
1706
IDENTIFY A TIME INCREMENT "T", A TIME FOR THE CURRENT PERIOD "TC", AND MAXIMUM TIME FOR THE DOMAIN "TM"
DETERMINE THE QUOTIENT OF ("TC + TM")/MINIMUM SYSTEM CREDITS, WHERE A SYSTEM CREDIT IS A "T"
1707
FALSE
ACEL. QUEUE EMPTY?
TRUE
PUT REFERENT TO DOMAIN OBJECT INTO BACKUP QUEUE
1708
PUT REFERENT TO DOMAIN OBJECT INTO ACCELERATOR QUEUE
1709
1710

1610
SWAP DATA IN ACCELERATOR QUEUE AND BACKUP QUEUE
1801
GET A FIRST DOMAIN FROM ACCELERATOR QUEUE
1802
DECREMENT CURRENT TIME ASSOCIATED WITH FIRST DOMAIN BY ONE INCREMENT
1803
FALSE
TRUE
CURRENT TIME == ZERO || NO RESOURCE REQUEST FROM FIRST DOMAIN?
1804
POLL FIRST DOMAIN UNTIL SCHEDULER INTERRUPT RECEIVED
1806
PUT FIRST DOMAIN INTO BACKUP QUEUE
1805

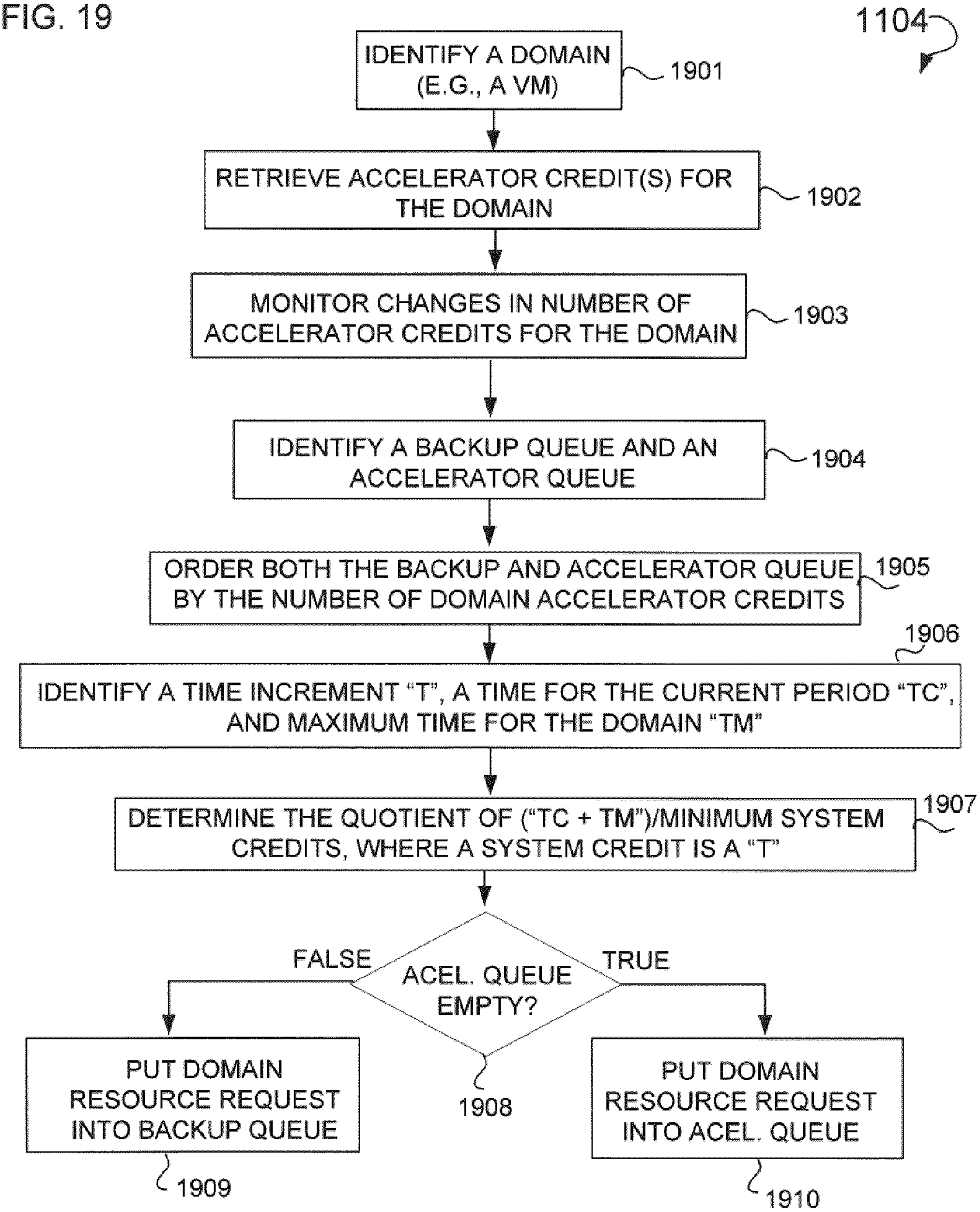
FIG. 19
1104
IDENTIFY A DOMAIN (E.G., A VM)
1901
RETRIEVE ACCELERATOR CREDIT(S) FOR THE DOMAIN
1902
MONITOR CHANGES IN NUMBER OF ACCELERATOR CREDITS FOR THE DOMAIN
1903
IDENTIFY A BACKUP QUEUE AND AN ACCELERATOR QUEUE
1904
ORDER BOTH THE BACKUP AND ACCELERATOR QUEUE BY THE NUMBER OF DOMAIN ACCELERATOR CREDITS
1905
1906
IDENTIFY A TIME INCREMENT "T", A TIME FOR THE CURRENT PERIOD "TC", AND MAXIMUM TIME FOR THE DOMAIN "TM"
DETERMINE THE QUOTIENT OF ("TC + TM")/MINIMUM SYSTEM CREDITS, WHERE A SYSTEM CREDIT IS A "T"
1907
FALSE
ACEL. QUEUE EMPTY?
TRUE
1908
PUT DOMAIN RESOURCE REQUEST INTO BACKUP QUEUE
1909
PUT DOMAIN RESOURCE REQUEST INTO ACEL. QUEUE
1910

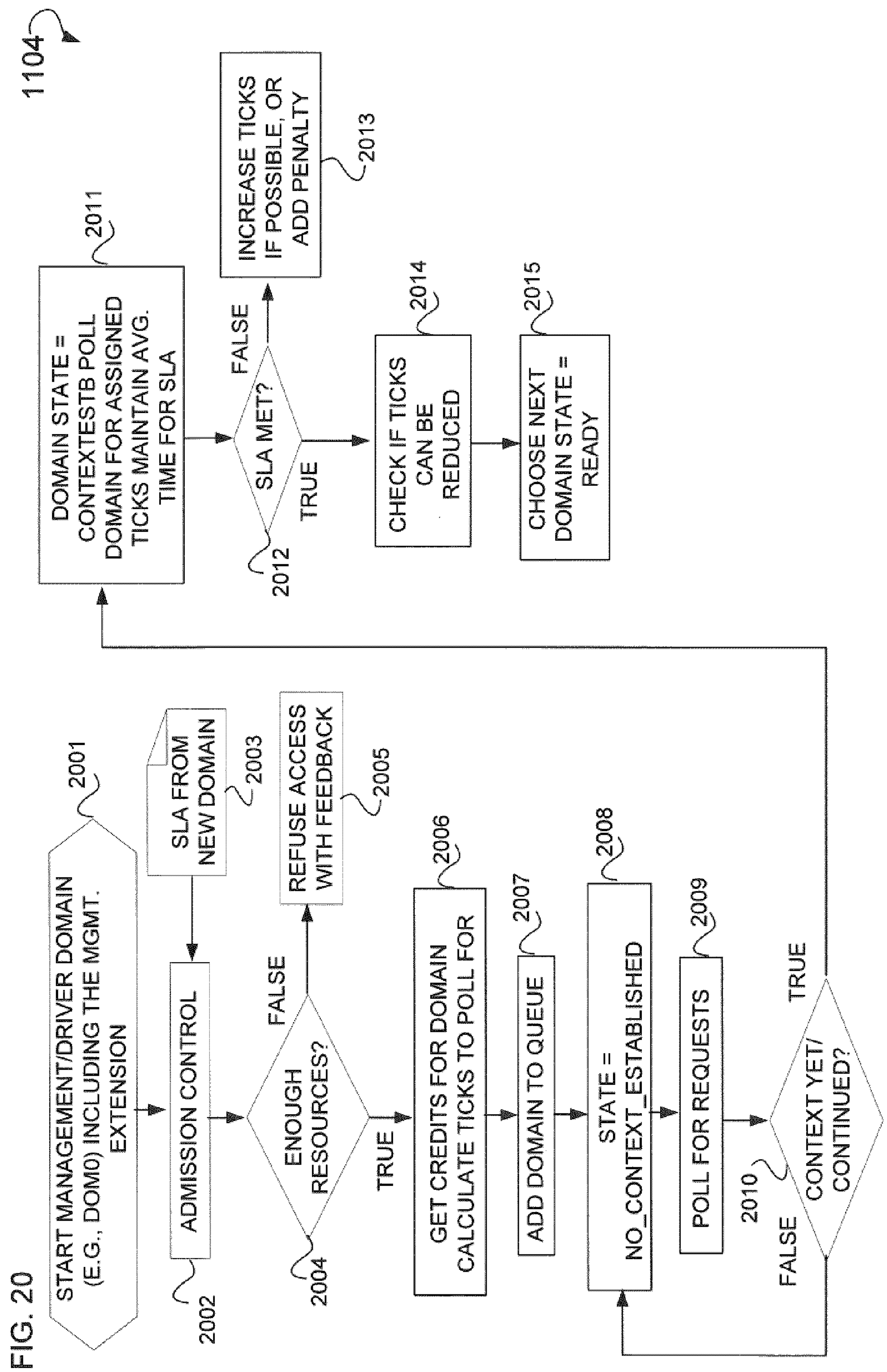
FIG. 20
1104
START MANAGEMENT/DRIVER DOMAIN (E.G., DOM0) INCLUDING THE MGMT. EXTENSION
2001
SLA FROM NEW DOMAIN
2003
ADMISSION CONTROL
2002
ENOUGH RESOURCES?
2004
FALSE
TRUE
REFUSE ACCESS WITH FEEDBACK
2005
GET CREDITS FOR DOMAIN CALCULATE TICKS TO POLL FOR
2006
ADD DOMAIN TO QUEUE
2007
STATE = NO_CONTEXT_ESTABLISHED
2008
POLL FOR REQUESTS
2009
CONTEXT YET/ CONTINUED?
2010
FALSE
TRUE
DOMAIN STATE = CONTEXTESTB POLL DOMAIN FOR ASSIGNED TICKS MAINTAIN AVG. TIME FOR SLA
2011
SLA MET?
2012
FALSE
TRUE
INCREASE TICKS IF POSSIBLE, OR ADD PENALTY
2013
CHECK IF TICKS CAN BE REDUCED
2014
CHOOSE NEXT DOMAIN STATE = READY
2015

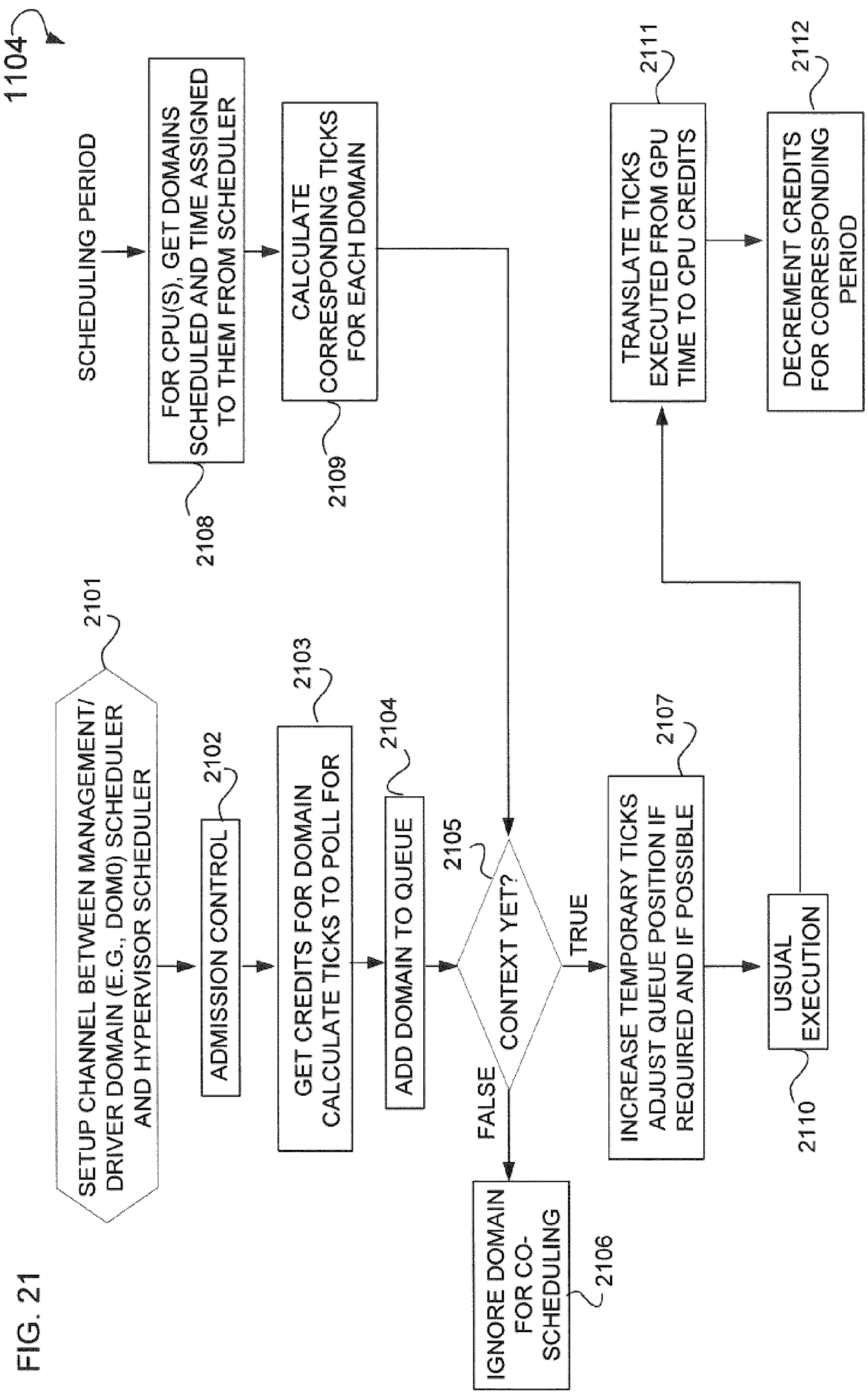

FIG. 21
1104
SETUP CHANNEL BETWEEN MANAGEMENT/ DRIVER DOMAIN (E.G., DOM0) SCHEDULER AND HYPERVISOR SCHEDULER
2101
ADMISSION CONTROL
2102
GET CREDITS FOR DOMAIN CALCULATE TICKS TO POLL FOR
2103
ADD DOMAIN TO QUEUE
2104
CONTEXT YET?
2105
FALSE
TRUE
IGNORE DOMAIN FOR CO-SCHEDULING
2106
INCREASE TEMPORARY TICKS ADJUST QUEUE POSITION IF REQUIRED AND IF POSSIBLE
2107
USUAL EXECUTION
2110
SCHEDULING PERIOD
FOR CPU(S), GET DOMAINS SCHEDULED AND TIME ASSIGNED TO THEM FROM SCHEDULER
2108
CALCULATE CORRESPONDING TICKS FOR EACH DOMAIN
2109
TRANSLATE TICKS EXECUTED FROM GPU TIME TO CPU CREDITS
2111
DECREMENT CREDITS FOR CORRESPONDING PERIOD
2112

2200
2201
SRAM
CPU
2202
. . . . .N
2205
NORTH BRIDGE
10/100/1000 ETHERNET
DVI
2207
ANALOG VGA
2204
2206
POINT TO POINT LINK
2210
2209
PCI
2208
2211
2213
HD AUDIO
USB
SOUTH BRIDGE
2212
2214
BOOT ROM
SATA
2215
PCIe
LPC
2203
2216
SUPER I/O
2217
2218
PARALLEL PORT
SERIAL PORT

MANAGING VIRTUALIZED ACCELERATORS USING ADMISSION CONTROL, LOAD BALANCING AND SCHEDULING

BACKGROUND

Multi-core based computing may be used to solve a number of data and/or compute intensive problems. Computers with multiple cores can be implemented as compute blades in a blade rack, a plurality of computers organized as one or more computing clusters, or some other suitable organization. These computers with multiple cores can be used within a data center, server farm, or some other suitable facility. Associated with these cores may be accelerators dedicated to specific computational tasks. Example accelerators include an accelerator Central Processing Unit (CPU), on-chip accelerator, cryptographic accelerators, and network accelerators.

BRIEF DESCRIPTION OF THE DRAWINGS

Some embodiments of the invention are described, by way of example, with respect to the following figures:

FIG. 8 is a flow chart illustrating the execution of a method, according to an example:embodiment, to implement admission control for accelerators in a virtualized environment.

FIG. 9 is a flow chart illustrating a method, according to an example embodiment, that implements load balancing for accelerators in a virtualized environment.

FIG. 12 is a flow chart illustrating the execution of a method by the management extension module, according to an example embodiment, to conduct admission control at boot time.

FIG. 13 is a flowchart illustrating the execution of operation, according to an example embodiment, to facilitate admission control.

FIG. 14 is a flowchart illustrating the execution of operation, according to an example embodiment, to facilitate load balancing between accelerators.

FIG. 17 is a flowchart illustrating the execution of operation, according to an example embodiment, that facilitates management/driver domain credit based scheduling.

FIG. 19 is a flowchart illustrating the execution of operation, according to an example embodiment, to facilitate accelerator credit based scheduling.

FIG. 20 is a flowchart illustrating execution of operation, according to an example embodiment, to facilitate Service Level Agreement (SLA) based feedback based scheduling.

FIG. 21 is a flowchart illustrating execution of operation, according to an example embodiment, to facilitate management and hypervisor based co-scheduling.

DETAILED DESCRIPTION

Illustrated is a system and method for resource management for virtualized accelerator based systems. A resource is a physical or virtual entity of limited availability. Example resources include accelerator CPU cycles, memory availability, memory bandwidth, and other suitable resources associated with an accelerator. Management includes the use of a management/driver domain to implement admission control to an accelerator, load balancing among accelerators, and scheduling for accelerators. An accelerator, as used herein, is a virtual or physical device dedicated to a specific computational task. Admission control, as used herein, relates to restricting access to an accelerator in overloaded conditions. Load balancing, as used herein, relates to utilization of the accelerator in the present system so as to balance accelerator resource requests across a plurality of accelerators. Scheduling, as used herein, relates to domain requests for access to an accelerator providing QoS guarantees, and to ensure fairness to a domain in the form of adequate resources being provided to this domain. Fairness, as under herein, includes equal access to the accelerator resources for a domain. An example of a management/driver domain is an XEN™ Domain0. In one example embodiment, management is facilitated with respect to an accelerator resource request generated by a VM. An example of a VM is an XEN™ DomainU. Management may be dictated, in part, by an SLA dictating the resources that a particular VM may access. For example, an SLA may dictate the appropriate response time for a software application being executed on a VM, a through-put time for a software application executed on a VM, or an execution time for a software application executed on a VM.

In some example embodiments, a resource management framework for a virtualized accelerator based systems is implemented through the use of admission control. In one example embodiment, admission control is initiated at the boot time for each VM residing on a computer system. Each VM has a SLA associated with it that may dictate, among other things, response time, execution time, and throughput. The SLA is used to generate a VM resource profile. This VM resource profile is mapped to the SLA and dictates, for example, the accelerator resources utilized by the VM or software application utilized by the VM. These accelerator resources include, for example, average accelerator CPU cycles, GPU cycles, average accelerator memory, or average bandwidth.

Figure 1:
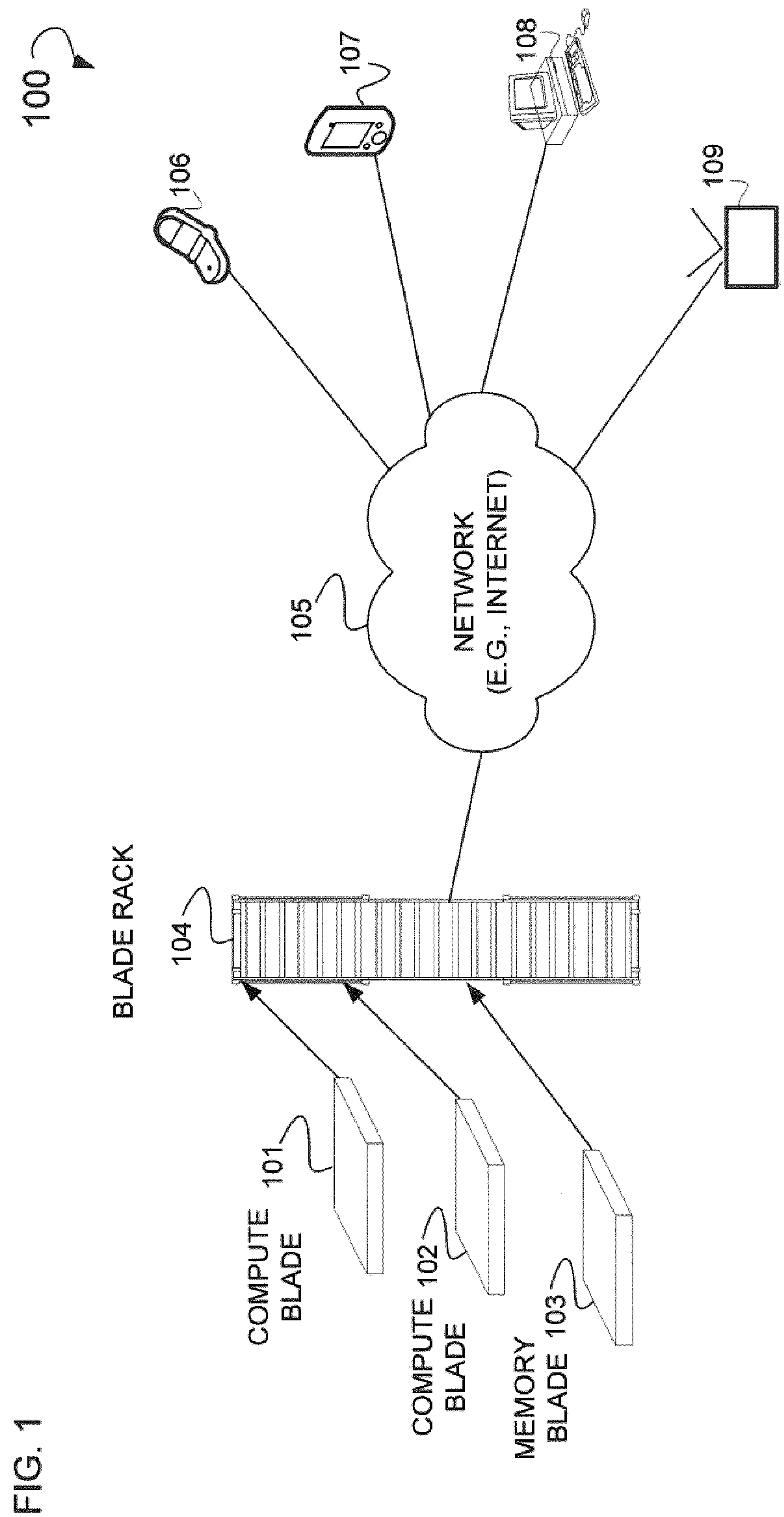
FIG. 1 is a diagram of a system, according to an example embodiment, illustrating a compute blade used to implement resource management for virtualized accelerator based systems.

FIG. 1 is a diagram of an example system 100 illustrating a compute blade used to implement resource management for virtualized accelerator based systems. Shown are a compute blade 101, a compute blade 102, and a memory blade 103 each of which is positioned proximate to a blade rack 104. The compute blades 101-102 are operatively connected to the network 105 via a logical or physical connection. The network 105 may be an internet, an intranet, a Wide Area Network (WAN), a Local Area Network (LAN), or some other network and suitable topology associated with the network. In some example embodiments, operatively connected to the network 105 is a plurality of devices including a cell phone 106, a Personal Digital Assistant (PDA) 107, a computer system 108 and a television or monitor 109 (e.g., collectively referenced herein as a display). In some example embodiments, the compute blades 101-102 communicate with the plurality of devices via the network 105.

A compute blade, as referenced herein, is a computer system with memory to read input commands and data, and a processor to perform commands manipulating that data. In some example embodiments, the compute blade also includes a backing storage (e.g., the above referenced memory blade) to store the results. This backing storage may be located native to the compute blade, or remote to the compute blade in a memory blade or storage blade.

Figure 2:
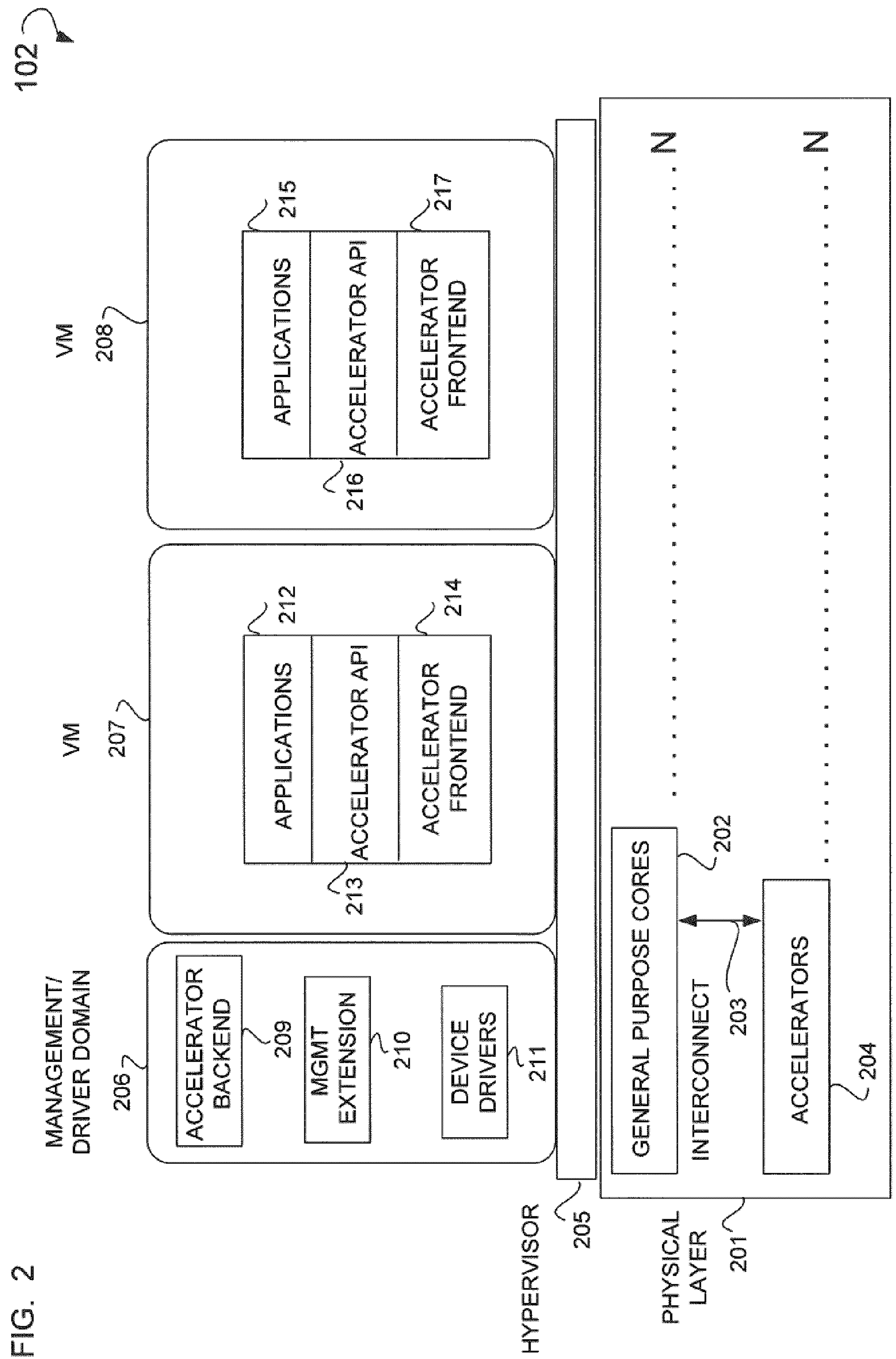
FIG. 2 is a diagram of an architecture for a compute blade, according to an example embodiment, that includes a virtualized accelerator based heterogeneous many-core platform.

FIG. 2 is a diagram of an example architecture for a compute blade 102 that includes a virtualized accelerator based heterogeneous many-core platform. Shown is a physical layer 201 that includes an accelerator(s) 204, and a general-purpose core(s) 202. In some example embodiments, the general-purpose core(s) 202 include an Intel Architecture (IA) instruction set compatible with LARRABEE™ or TOLAPAI™ cores. An interconnect 203 operatively connects the accelerator(s) 204 and the general purpose-core(s) 202. Example accelerators include CPU, Graphical Processing Units (GPUs), cryptographic accelerators, on-chip accelerator, or network accelerators. The interconnect 203 may utilize a Peripheral Component Interconnect Express (PCIe), or some other suitable protocol. In some example embodiments, the interconnect 203 includes an optical fabric, copper based fabric, or some other suitable fabric. Also illustrated is a hypervisor layer 205 that may be a Type 1, Type 2, or Hybrid-Type hypervisor. A hypervisor or Virtual Machine Monitor (VMM), is a computer software/hardware platform virtualization software that allows multiple VMs (e.g., Operating Systems (OSs)) to run on a host computer concurrently. Example schemes implemented by the virtualization software include Full Virtualization, Hardware-Assisted Virtualization, Partial Virtualization, Paravirtualization, and Operating System-Level Virtualization. Suitable operating systems include for example the LINUX™ operating system, Microsoft Corporation's WINDOWS™ operating system, Sun Corporation's SOLARIS™ operating system, the UNIX™ operating system, or some other suitable operating system known in the art.

In some example embodiments, residing on the hypervisor 205 is a plurality of domains that include a management/driver domain 206, and a VM 207 and VM 208. The management/driver or domain 206 includes an accelerator backend module 209, a management extension module 210, and a device driver module 211. The VM 207 includes an application module 212, an accelerator API 213, and an accelerator frontend module 214. Example applications include financial applications, financial-market applications, applications utilizing the Black-Scholes derivative pricing theory algorithm, applications performing matrix multiplication, applications performing Fast-Walsh transformations, and gaming applications. Similarly, the VM 208 includes an application module 215, an accelerator API 216, and an accelerator frontend module 217. As is more fully illustrated below, the management/driver domain 206 may utilize a standardized Application Programming Interface (API) (e.g., an XEN™provided interface) to facilitate communication between the accelerator backend module 209 and the accelerator frontend module 214 and 217 that reside on the VM 207 and 208 respectively. The various modules illustrated herein may be implemented in hardware, software or firmware.

As is more fully illustrated below, in some example embodiments, accelerator resources are managed by the hypervisor 205 and the management/driver/accelerator domain 206. The management/driver/accelerator domain 206 may be a Domain0 (name for management domain with Xen hypervisor) generated by the hypervisor 205. The management/driver/accelerator domain 206 has direct access to the accelerator 204 and offers extended management functionality for tracking the joint use of general purpose and accelerator resources, sharing accelerator resources, and understanding the constraints as dictated by an SLA arising from running different versions of the applications.

Additionally, as is more fully illustrated below, the VM 207 may access the accelerator via the accelerator frontend 214. The accelerator frontend 214 may interface with the accelerator backend 209 such that accelerator resource requests are formatted such that an accelerator can process these requests. The accelerator backend module 209 understands the details of the accelerator as these details relate to accelerator resources.

Figure 3:
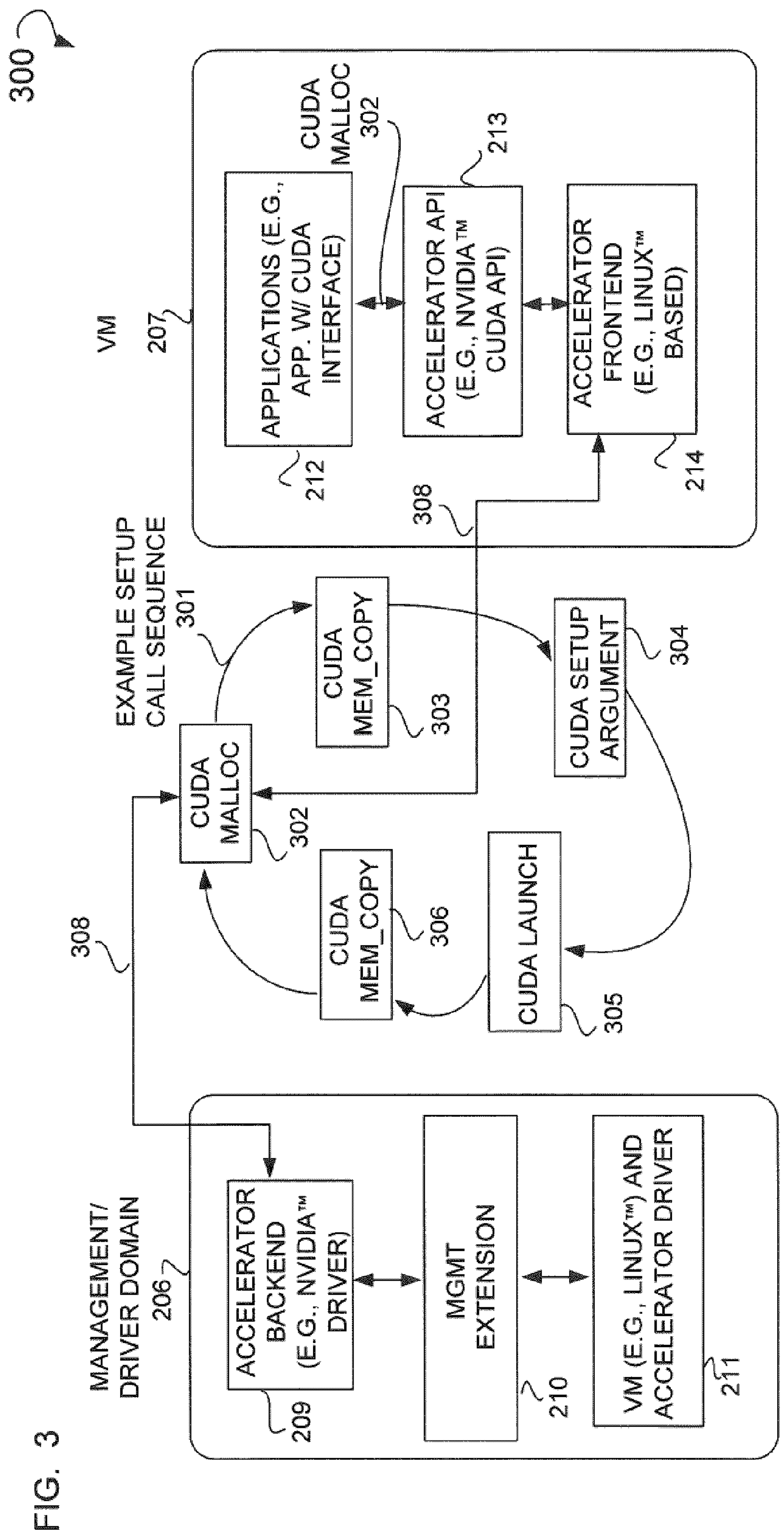
FIG. 3 is a diagram of a system, according to an example embodiment, illustrating the call setup sequence for the management/driver domain and a Virtual Machine (VM).

FIG. 3 is a diagram of an example system 300 illustrating the call setup sequence for the management/driver domain and a VM. Shown is the management/driver domain 206 and the VM 207, and various an example function call setup sequence 301 implemented for by each. These various functions may be provided as a part of the Compute Unified Device Architecture (CUDA™), and are an extension of the C/C++ programming languages. In one example embodiment, the setup call sequence 301 includes a CUDA™ malloc call 302, a CUDA™ memory copy call 303, a CUDA™ setup argument call 304, a CUDA™ launch call 305, and a CUDA™ memory copy call 306. These various functions (e.g., functions 302-306) can be called from the accelerator frontend 214. Additionally, as illustrated at 302, CUDA™ function calls may be made from the applications module 212 to the accelerator API 213. Moreover, as illustrated via the communication channel 308, CUDA™ based function calls can be made by the accelerator frontend module 214 requesting the execution of functions residing on the accelerator backend module 209. These further CUDA™ based function calls may relate to accelerator resources, and may be in the form of an accelerator resource request. The communication channel 308 may be a logical or physical communication channel.

Figure 4:
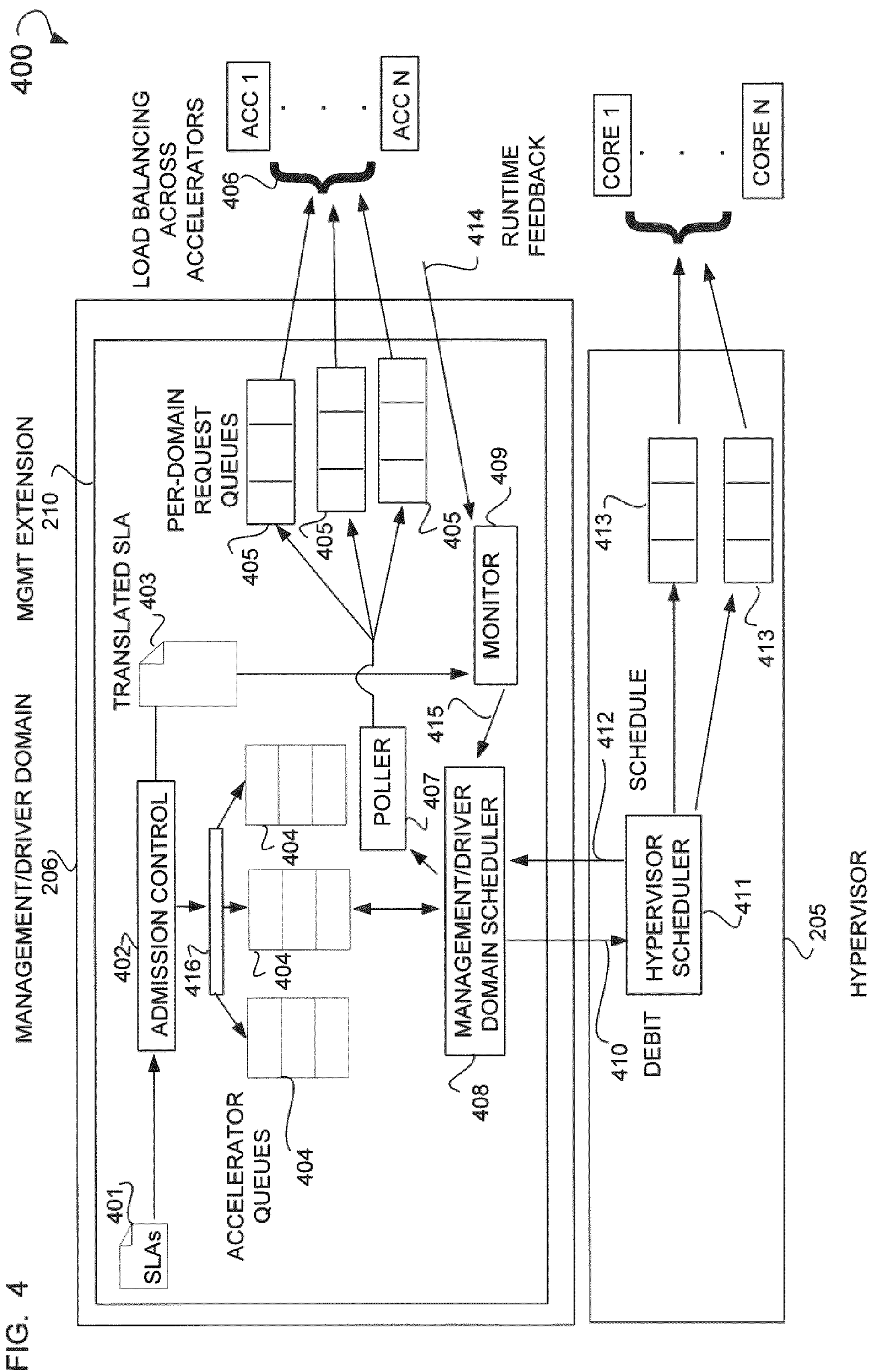
FIG. 4 is a diagram of a system, according to an example embodiment, used to execute the management extension module to facilitate admission control, load-balancing, and scheduling for an accelerator.

FIG. 4 is a diagram of an example system 400 used to execute the management extension module to facilitate admission control, load-balancing, and scheduling for an accelerator. Illustrated is the management extension module 210 and the various modules, and data structures included therein. These modules and data structures include, for example, an admission control module 402 that receives and processes an SLA. In some example embodiments, the SLA is identified for the VM at VM-boot time. This SLA may be retrieved from a data store operatively connected to the compute blade 102. As a result of this processing of the SLA, the admission control module 402 generates a translated SLA 403 that includes, for example, weighted values (e.g., an accelerator weight as defined below) related to each of the accelerators that are part of the physical layer 201. Translation, as used herein, may include mapping the SLA to a VM resource profile. A weighted value, as used herein, is a numeric value that allows for a determination of the performance capabilities of one accelerator as compared to another accelerator. When a suitable accelerator is found, the admission control module adds a referent to the domain in corresponding accelerator queue. The poller 407 may process resource requests generated by a VM (e.g., VM 207 and 208). A resource request includes, for example, one of the previously illustrated functions 302-306 and calls to these functions. In some example embodiments, these functions 302-306 are associated with objects or structures that are included as part of the resource request. These resource requests are placed into one or more data structures such as the shown per-domain request queues 405. In one example embodiment, there is one request queue 404 for one domain (e.g., the VM 207 and 208). A poller module 407 issues a request to an accelerator to execute a function (e.g., one or more of the functions 302-306). These functions, for execution, are retrieved from the per-domain request queues 405. As referenced at 406, load balancing is performed across a plurality of accelerators when an accelerator (e.g., the accelerator 204) currently associated with a domain is over loaded and the domain has no context established on the accelerator so the domain can begin utilizing another accelerator. As used herein, a context is a state of processing data for a VM.

In some example embodiments, a management/driver domain scheduler module 408 executes scheduling logic for a plurality of accelerators. This scheduling logic determines the order in which a resource request is to be processed by an accelerator. This determination is based, in part, on the translated SLA 403. The translated SLA 403 may be a VM resource profile. A monitor module 409 is implemented that provides feedback to the management/driver domain scheduler module 408 regarding the status of a particular accelerator. This status may be with respect to whether the accelerator is overloaded and that a resource request needs to be balanced across a plurality of accelerators. Also shown, is a hypervisor scheduler 411 that resides as part of a hypervisor 205. This hypervisor scheduler 411 may provide scheduling data to the management/driver domain scheduler module 408 relating to the availability of the general purpose cores 202 (e.g., CPUs). Additionally, the hypervisor scheduler 411 may receive debit information 410 from the management/driver domain scheduler module 408 relating the availability of accelerators. In some example embodiments, some resource requests are provided to the general purpose cores 202 when the hypervisor scheduler selects some domain from the queues 413. The general purpose cores 202 process this resource request from the domains.

In some example embodiments, load balancing is used to move a resource request from being processed by one accelerator to being processed by another accelerator. For example, when the resource requests of a particular domain no longer have context on a particular accelerator, the resource request may be shifted to another accelerator that is capable of processing the resource request. This shifting, or load balancing, may be based upon accelerator weight considerations as outlined below. In one example embodiment, a load balancer 416 is interposed between the admission control module 402 and the accelerator queues 404. In the alternative, a load balancing module may be implemented as part of the management/driver domain scheduler module 408. Further, in some example embodiments, a load balancing module 416 is interposed between the poller module 407 and the per-domain request queues 405.

Figure 5:
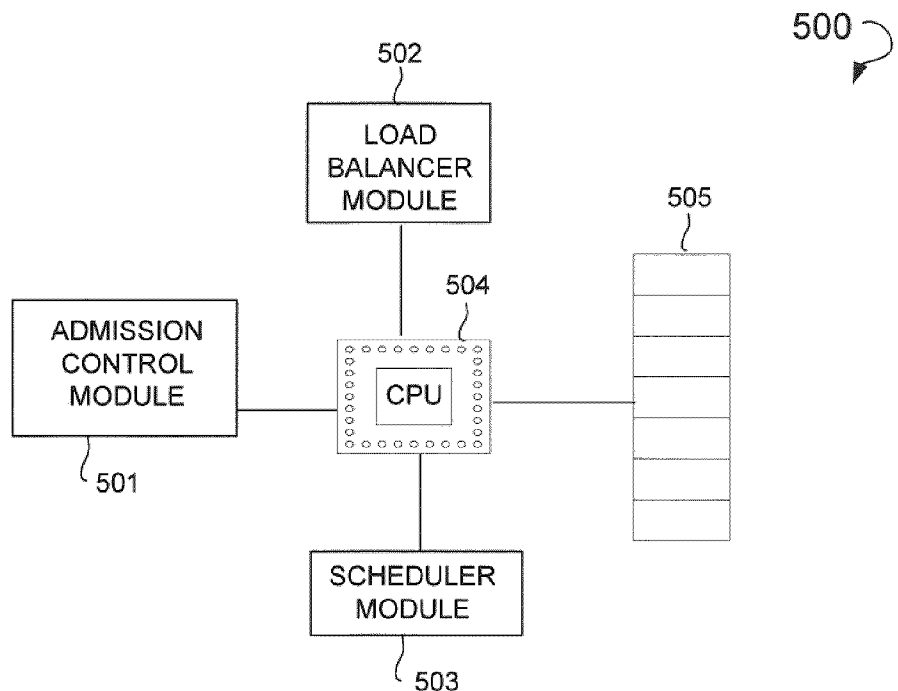
FIG. 5 is a block diagram of a computer system, according to an example embodiment, in the form of a compute blade that implements admission control for accelerators in a virtualized environment.

FIG. 5 is a block diagram of an example computer system 500 in the form of the compute blade 102 that implements admission control for accelerators in a virtualized environment. These various blocks may be implemented in hardware, firmware, or software as part of the compute blade 101, or compute blade 102. These various blocks may be logically or physically operatively connected. Illustrated is an admission control module 501 that resides in a management/driver domain 206, the admission control module 501 to admit a domain, that is part of a plurality of domains, into the computer system e.g., compute blade 101 or 102). The admission based upon one of a plurality of accelerators satisfying a resource request of the domain. A load balancer module 502 is shown that resides in the management/driver domain 206, to balance at least one load from the plurality of domains across the plurality of accelerators. A scheduler module 503 is illustrated as part of the management/driver domain 206 to multiplex multiple requests from the plurality of domains to one of the plurality of accelerators. In some example embodiments, the domain is a VM. In some example embodiments, the accelerator includes at least one of an accelerator CPU, a GPU, a cryptographic accelerator, on-chip accelerator, or a network accelerator. The scheduler module may be instructed by an SLA that dictates a QoS that the domain is to receive from the at least one accelerator of the plurality of accelerators. The SLA comprises data related resources including at least one of accelerator CPU cycles, GPU cycles, memory availability, or memory bandwidth. The scheduler module may be operatively connected to a hypervisor scheduler. Each of the admission control module 501, load balancer module 502, and scheduler module 503 is operatively connected to a CPU 504 and memory 505.

Figure 6:
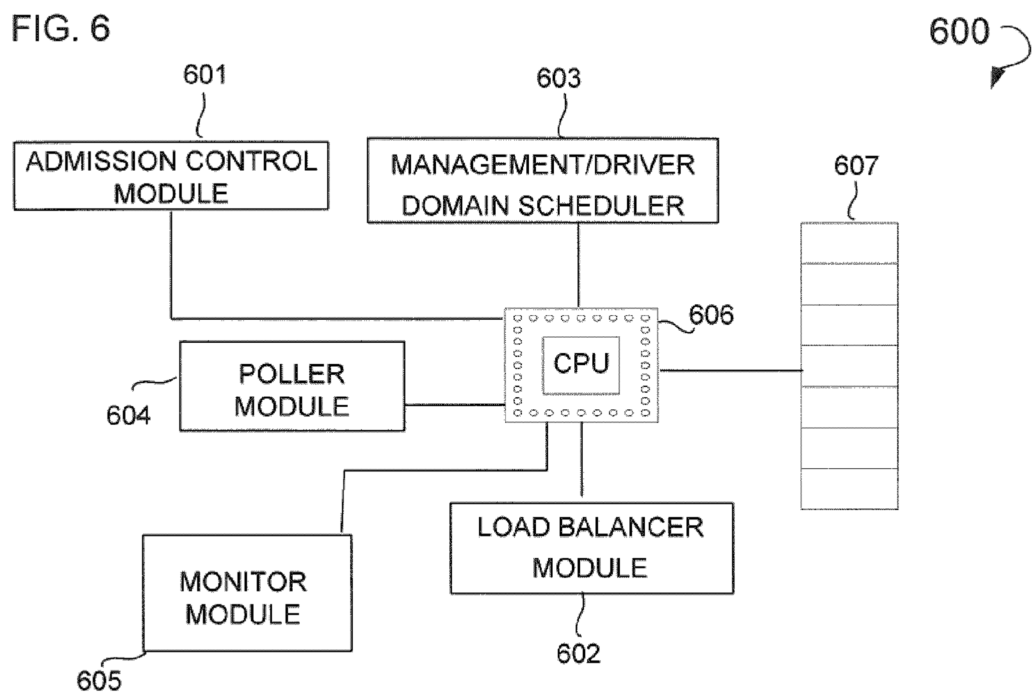
FIG. 6 is a block diagram of a computer system, according to an example embodiment, in the form of a compute blade that implements load balancing for accelerators in a virtualized environment.

FIG. 6 is a block diagram of an example computer system 600 in the form of the compute blade 102 that implements load balancing for accelerators in a virtualized environment. These various blocks may be implemented in hardware, firmware, or software as part of the compute blade 101, or compute blade 102. Further, these various blocks are logically or physically operatively connected. Illustrated is an admission control module 601 to get an accelerator profile, the accelerator profile identifying an accelerator resource to allocate to a VM. The admission control module 601 is used to determine an accelerator type based upon the accelerator profile to match a resource request of the VM to the accelerator resource. Further, the admission control module 601 is used to store the accelerator type to a list of accelerators that match the resource request, the list organized by weights that define a numeric priority of one accelerator type as compared to another accelerator type. The admission control module 601 may also be used to get a VM resource profile that represents a desired SLA for the VM. The VM resource profile includes a description of resources allocated to applications so as to meet the SLA. Additionally, a load balancer module 602 is used to check a current load to check a current load to determine an amount of accelerator resources that are required based upon the VM resource profile. Further, a management/driver domain scheduler 603 is used to make the accelerator resource available to the VM, the accelerator resource made available to the VM where an accelerator resource threshold is not exceeded. A threshold may be an eighty percent (80%) utilization of an available accelerator resource. The management/driver domain scheduler module 603 can also process the accelerator resource request of the VM. Further a poller module 604 is used to process the accelerator resource request of the VM. The management/driver domain scheduler module 603 is used to associate the VM with an accelerator in an accelerator memory, the accelerator memory allocated to the VM. The resource request of the VM is stored into a data structure associated with the accelerator memory. A monitor module 605 is used to determine that a load on the accelerator is greater than a threshold value associated with the accelerator. The load balancing module 602 is used to migrate an additional resource request to an additional accelerator to process the additional resource request, the additional accelerator selected based upon an accelerator weight associated with the additional accelerator. In some example embodiments, the resource request includes a function call to utilize the accelerator resource. In some example embodiments, the list is a priority queue. Each of the admission control module 601, load balancer module 602, and driver/domain scheduler module 603, and poller module 604 are operatively connected to a CPU 606 and memory 607.

In some example embodiments, the accelerator weight is calculated in the following manner. Given different accelerator profiles, the accelerator backend 209 calculates an accelerator's weight based on the available hardware capabilities and then uses this weight to order the available accelerators in a priority queue, such as the per domain request queues 405. The accelerator with highest weight is the most capable one in the system for its category. The accelerator weight may be calculated using the following values to account for heterogeneity of the resources:

accelerator weight={[core_clock*num_pes]*[mem_clock*(unallocated) memory]*bandwidth}/current load As used herein, "core_clock" is a value denoting the frequency of a clock utilized by one or more of the general purpose cores 202. "Num_pes," as used herein, is the number of available processing elements on a particular accelerator (e.g., one of the accelerators 204). As used herein, "mem_clock" is a frequency of a clock utilized by physical memory utilized by one of the accelerators 204. "Unallocated memory," as used herein, is memory available for utilization by one of the accelerators 204. "Bandwidth," as used herein, is the available bandwidth that may be utilized by one of the accelerators 204. "Current load," as used herein, is the current job performed by one of the accelerators 204 and a numerical rating associated with this job. Further, threshold and padding values may be added to accelerator weight to avoid "ping-ponging" between accelerators (e.g., bouncing back and forth between accelerators). In some example embodiment, the accelerator weight is determined dynamically after the boot up of the hypervisor and VM, whereas in other embodiments it is determined statically at boot time.

Figure 7:
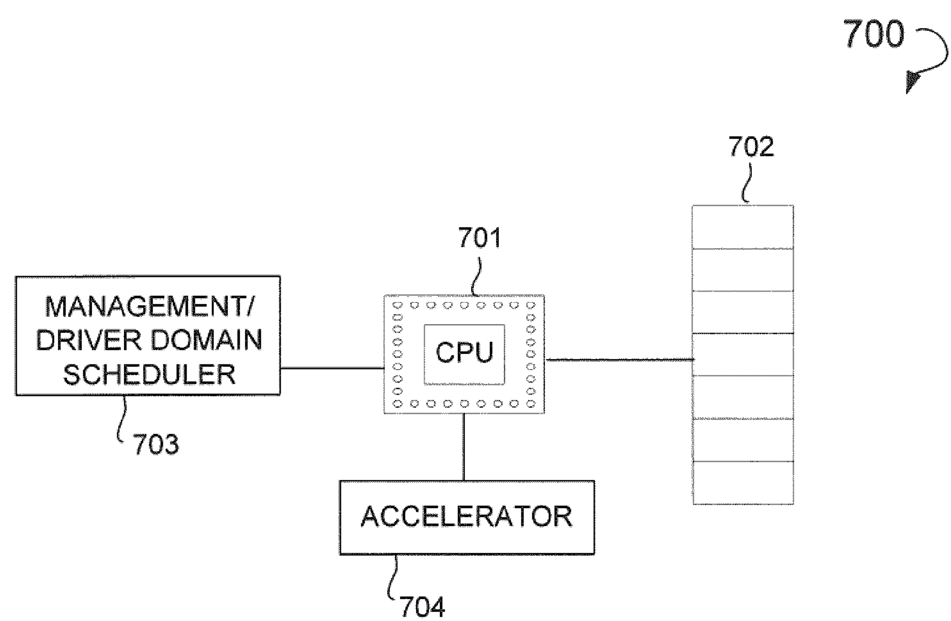
FIG. 7 is a block diagram of a computer system, according to an example embodiment, in the form of a compute blade that implements scheduling for accelerators in a virtualized environment.

FIG. 7 is a block diagram of an example computer system in the form of the compute blade 102 that implements scheduling for accelerators in a virtualized environment. These various blocks may be implemented in hardware, firmware, or software as part of the compute blade 101, or compute blade 102. Further, these various blocks are logically or physically operatively connected. Illustrated is a management/driver domain scheduler module 703 that is operatively connected to a CPU 701 that, in turn, is operatively connected to a memory 702. The management/driver domain scheduler module 703 is used to receive a resource request which identifies accelerator resources to be utilized by a domain. The management/driver domain scheduler module 703 is akin to the management/driver domain scheduler 408. The management/driver domain scheduler module 703 is also used to retrieve a scheduling policy, the scheduling policy to dictate a use of the accelerator resources by the domain.

In some example embodiments, the scheduling policy includes the identification of a domain credit, the domain credit defining a time value during which the domain can access an accelerator 704 operatively connected to the CPU 701. The accelerator 704 is akin to the accelerator 204. The scheduling policy also includes ordering the referents to domains, within a queue based upon the domain credit. In some example embodiments, the scheduling policy includes identifying an accelerator credit, the accelerator credit defining a time value during which the domain can access the accelerator 704. Moreover, the scheduling policy also includes ordering the domains, using the management/driver domain scheduler module 703, within a queue based upon the accelerator credit. The scheduling policy also includes processing the resource request, using the accelerator 704, based upon a position of the resource request within the queue. In some example embodiments, the scheduling policy includes identifying an SLA, the SLA defining duration for which the domain would like to access the accelerator 704. The management/driver domain scheduler module 703 is used to determine that the time has been exceeded. In some example embodiments, the scheduling policy includes using the management/driver domain scheduler module 703 to identify an accelerator credit associated with a domain. Additionally, the management/driver domain scheduler module 703 is used to identify a schedule during which the domain is to access a CPU of the computer. In some example embodiments, the identification of the schedule is performed by a hypervisor scheduler working with the management/driver domain scheduler module 703. The management/driver domain scheduler module 703 is used to determine that a context shift has occurred between the accelerator and the CPU. The management/driver domain scheduler module 703 is used to translate the accelerator credit associated with the domain to a CPU credit associated with the CPU. In some example embodiments, a context shift is a change in a thread of execution from an accelerator backend to a kernel space. In some example embodiments, translate includes converting a numeric value associated with the accelerator credit to a numeric value associated with the CPU credit. Further, in some example embodiments, CPU credits are translated to accelerator credits.

FIG. 8 is a flow chart illustrating the execution of an example method 800 to implement admission control for accelerators in a virtualized environment. This method 800 may be implemented by the computer system 500. Operation 801 is executed by the admission control module 501 to admit a domain, that is part of a plurality of domains, into the computer system 500 based upon one of a plurality of accelerators satisfying a resource request of the domain. Operation 802 is executed by the load balancer module 502 to balance at least one load from the plurality of domains across the plurality of accelerators. Operation 803 is executed by the scheduler module 503 to multiplex multiple requests from the plurality of domains to one of the plurality of accelerators. In some example embodiments, the accelerator includes at least one of an accelerator CPU, a GPU, a cryptographic accelerator, on-chip accelerator, or a network accelerator. In some example embodiments, the scheduler module is instructed by a SLA that dictates a QoS that the domain is to receive from the at least one accelerator of the plurality of accelerators. In some example embodiments, the SLA comprises data related resources including at least one of accelerator CPU cycles, GPU cycles, memory availability, or memory bandwidth.

FIG. 9 is a flow chart illustrating an example method 900 that implements load balancing for accelerators in a virtualized environment. This method 900 may be executed on the compute blade 102. Operation 901 is executed by the admission control module 601 to identify an accelerator resource to allocate to a VM. Operation 902 is executed by the admission control module 601 to determine an accelerator type based upon the accelerator profile to match a resource request of the VM to the accelerator resource. Operation 903 is executed by the admission control module 601 to store the accelerator type to a list of accelerators that match the resource request, the list organized by weights that define a numeric priority of one accelerator type as compared to another accelerator type. Operation 904 is executed by the admission control module 601 to get a VM resource profile that represents a desired SLA for the VM. Operation 905 is executed by the load balancer module 602 to check a current load to determine an amount of accelerator resources that are required based upon the VM resource profile. Operation 906 is executed by the admission control module 601 to admit the VM to access the accelerator resource, the admission made where an amount of accelerator resources available is Ewe equal or more than required by the VM based upon the VM resource profile. In some example embodiments, some other binary operation is performed to compare the amount of available accelerator resources and VM resource profile. These binary operations may include greater than (>), less than (<), less than or equal to (<=), or equivalence (=). Operation 907 is executed by the management/driver domain scheduler 603 to identify an accelerator that can process the accelerator resource request of the VM. Operation 908 is executed by the poller module 604 to issue a request to process the accelerator resource request of the VM. Operation 909 is executed by the management/driver domain scheduler 603 to associate the VM with an accelerator in an accelerator memory, the accelerator memory allocated to the VM. Operation 910 is executed to store the resource request of the VM into a data structure associated with the accelerator memory. In some example embodiments, the VM is associated with an accelerator and the association stored into a data structure. Operation 911 is executed by the monitor module 605 to determine that a load on the accelerator is greater than a threshold value associated with the accelerator. Operation 912 is executed by the load balancer module 602 to migrate an additional resource request, using a load balancing module, to an additional accelerator to process the additional resource request, the additional accelerator selected based upon an accelerator weight associated with the additional accelerator. In some example embodiments, the resource request includes a function call to utilize the accelerator resource. The list may be a priority queue.

Figure 10:
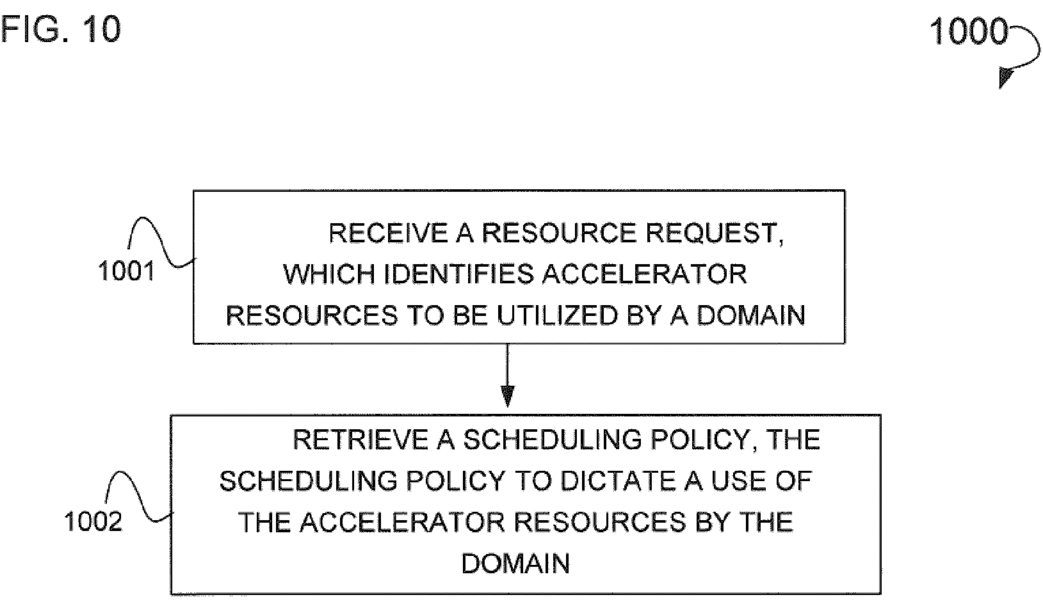
FIG. 10 is a flow chart illustrating a method, according to an example embodiment, that implements scheduling for accelerators in a virtualized environment.

FIG. 10 is a flow chart illustrating an example method 1000 that implements scheduling for accelerators in a virtualized environment. This method 1000 may be executed by the management/driver domain scheduler module 408. Operation 1001 is executed by the management/driver domain scheduler module 408 to receive a resource request, which identifies accelerator resources to be utilized by a domain. Operation 1002 is executed by the management/driver domain scheduler module 408 to retrieve a scheduling policy, using the management/driver domain scheduler module, the scheduling policy to dictate a use of the accelerator resources by the domain. In some example embodiments, the scheduling policy includes identifying a domain credit, using the management/driver domain scheduler module, the domain credit defining a time value during which the domain can access the accelerator. Further, the scheduling policy includes ordering the resource request, within a queue based upon the domain credit. Additionally, the scheduling policy includes processing the resource request based upon a position of the domain within the queue associated with the accelerator 704.

In some example embodiments, the scheduling policy includes identifying an accelerator credit, the accelerator credit defining a time value during which the domain can access the accelerator. The scheduling policy also includes ordering the resource request within a queue based upon the accelerator credit. Moreover, the scheduling policy also includes processing the resource request based upon a position of the resource request within the queue through the use of the accelerator 704. In some example embodiments, the scheduling policy also includes identifying an SLA, the SLA defining a time during which the domain can access the accelerator 704. The scheduling policy may also include determining, that the time has been exceeded using the management/driver domain scheduler module 408. The SLA is identified as a resource profile. In some example embodiments, the scheduling policy includes identifying, using the management/driver domain scheduler module 408, and an accelerator credit associated with a domain. The scheduling policy may also include identifying, using the management/driver domain scheduler module 408, and a schedule during which the domain is to access a CPU of the computer. The scheduling policy may also include translating the accelerator credit associated with the domain to a CPU credit associated with the CPU. In some example embodiments, a context shift is a change in a thread of execution from an accelerator backend to a kernel space. Additionally, in some example embodiments translate includes converting a numeric value associated with the accelerator credit to a numeric value associated with the CPU credit. This translation may be performed to debit the number of CPU credits so the more accelerator credits that are used the few number of CPU credits that will be available.

Figure 11:
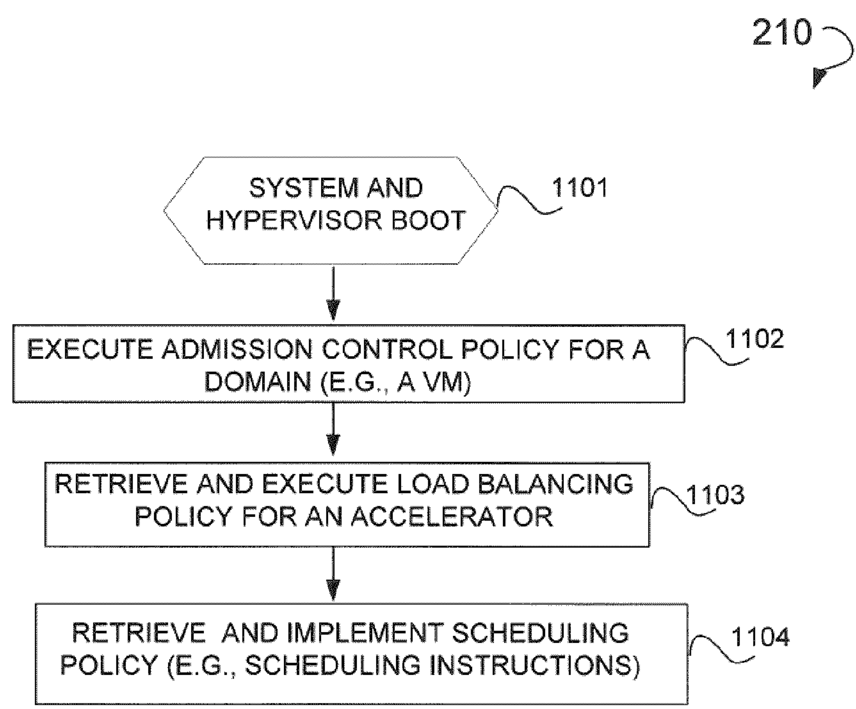
FIG. 11 is a flowchart illustrating an execution of a method, according to an example embodiment, by the management extension module.

FIG. 11 is a flowchart illustrating an execution of an example method by the management extension module 210. Shown are various operations that may be executed as a part of the management extension module 210. An operation 1101 is executed to facilitate a system (e.g., the compute blade 102) and hypervisor boot. The execution of operation 1101 may also include the booting of a VM. An operation 1102 is executed by, for example, the admission control module 402. This operation 1102 executes an admission control policy for a particular domain (e.g., VM 207). In some example embodiments, this admission control policy may be dictated by an SLA. An operation 1103 is executed by, for example, the management/driver domain scheduler module 408 to implement a load-balancing policy for an accelerator. This load-balancing policy may be dictated by an SLA. The operation 1104 is executed by, for example, the management driver/domain scheduler module 408 to retrieve and implement a scheduling policy. Again, the scheduling policy may be dictated by a SLA.

In some example embodiments, scheduling is introduced in the management/driver domain 206 to provide QoS guarantees and fairness to requests provided to the accelerator 204. There are various scheduling policies that can be implemented by the management driver/domain scheduler module 408. Example policies include: first-come-first serve, round robin, management/driver domain credit, accelerator credit, SLA-feedback based scheduling, and co-scheduling of the management domain and hypervisor. These various policies are discussed in more detail below.

FIG. 12 is a flow chart illustrating the execution of a method by the management extension module 210 to conduct admission control atboot time. An operation 1201 is executed by the admission control module 402 wherein a request is made to start (e.g., boot up) a domain. Operation 1202 is executed by the admission control module 402 such that static checks are performed to ensure that there is an accelerator meeting the domain's needs and that the domain has privileges to use that accelerator. Privileges may be established by a system administrator, or other suitable individual. Operation 1203 is executed by the admission control module 402 to conduct a fine grain resource check. An operation 1204 is executed by the admission control module 402 to determine the current load in the system (e.g., the load resulting from all domains are already started in the system). Operation 1205 is executed by the admission control module 402 to calculate the amount of accelerator resources that are required by this current set of VMs/domains. Operation 1206 is executed by the admission control module 402 to receive an additional domain request that specifies a resource profile. A decisional operation 1207 is executed by the admission control module 402 to determine if the addition of this new resource request exceeds a threshold value (e.g., 80% accelerator utilization). Where decisional operation 1207 evaluates to "true," operation 1208 is executed and the domain is not started (e.g., it is denied access to the computer system in the form of the compute blade 101). Where decisional operation 1207 evaluates to "false," an operation 1209 is executed and the domain is started and an entry is made in the accelerator queue adding that domain to the list of admitted VMs.

FIG. 13 is a flowchart illustrating the execution of operation 1102, Shown is operation 1301 that is executed to get an accelerator weight. Operation 1302 is executed to get an accelerator demand profile. The accelerators weight and accelerator domain profile may be retrieved from a data store operatively connected to the compute blade 102. The operation 1303 is executed to receive an accelerator resource use request from a domain. The resource requests may be generated by, for example, the VM 207 and provided to the management/driver domain 206. The resource request may seek to utilize an accelerator managed by the management/driver domain 206. A decisional operation 1304 is shown that determines whether the requested accelerator is available. In one example embodiment, a check is performed by the decisional operation 1304 to determine whether there are free, available accelerators on the computer system (e.g., the compute blade 102). In cases where decisional operation 1304 evaluates to "true" operation 1306 is executed. In cases where decisional operation 1304 evaluates to "false" operation 1305 is executed. Operation 1305 is executed to select a different accelerator where the requested accelerator is not available to the requesting domain. An accelerator may not be available to a domain due to the requirements of the accelerator resource request. For example, if the domain requests resources that the accelerator cannot provide, or those that the domain is not entitled to receive. Operation 1306 is executed to associate a domain with an accelerator. In some example embodiments, association takes the form of a mapping between a particular virtual machine and a particular accelerator. Operation 1307 is executed to associate a domain with an accelerator, where certain requirements are met. These requirements include those dictated by a SLA for the domain making the resource request.

In some example embodiments, an operation 1308 is executed to convert an SLA into a particular metric through interpreting or compiling the SLA. Through the conversion process various parameters relating to CPU cycles, memory allocation, and other accelerator resources are provided. The metric can be compared with the runtime feedback generated by the compute blade 102 to monitor how well the compute blade 102 is meeting all the QoS or fairness requirements specified in the SLA. The metric also enables any runtime adjustments required to improve the performance of the resource management algorithm use therein. An operation 1309 is shown that is executed to utilize accelerator resources for the processing the resource request. Processing may include the rendering of an image on a monitor. Decisional operation 1310 is illustrated that determines whether the metric is met. In cases where decisional operation 1310 evaluates to "true," the operation 1309 is executed. In cases where decisional operation 1310 evaluates to "false," an operation 1311 is executed. Operation 1311, when executed, requests an accelerator. This accelerator is requested where a metric has not been met as dictated by the SLA. The implementation of operation 1311 is optional.

In some example embodiments, the accelerator weight and the domain profiles are used to decide admissibility for a domain and its association with a particular accelerator. The accelerator backend module 209 maintains a count of accelerators that are under a "threshold load" value (e.g., a static parameter based on the number of domains that can be assigned to one accelerator). When a domain provides a resource request to the management/driver domain 206, the accelerator backend module 209 determines if the accelerator exists. If no such accelerator is present, the domain is refused access. The accelerator backend module 209 then selects the most capable accelerator from an accelerator queue. The accelerator backend module 209 checks if the selected accelerator is capable of processing the resource request. If the check is successful, the domain is associated with the accelerator. Otherwise, the domain is refused access. This feedback allows the compute blade 102 to make a choice of scheduling the VM application component desiring computation (e.g., a component of the application 212) on either kind of accelerator that can fulfill its demand, or the multi-core CPUs present in the platform.

FIG. 14 is a flowchart illustrating the execution of operation 1103. Illustrated is an operation 1401 that is executed to allocate accelerator memory to a particular domain, and to increment a reference counter value where allocation occurs. As used herein, a reference may be a pointer to a position in memory, a reference, or sonic other suitable way of allowing access to memory. Operation 1402 is executed to associate a domain with an accelerator, where the memory of the accelerator has been allocated, A decisional operation 1403 is shown that determines whether the reference counter value is equal to zero. The reference counter value is used in deciding when a domain is available for migration to another accelerator. In cases where decisional operation 1403 evaluates to "false," an operation 1404 is executed. In cases where decisional operation 1403 evaluates to "true," an operation 1405 is executed. Operation 1404, when executed, processes a resource request with an accelerator. Processing may include the allocation of memory, CPU cycles of an accelerator to a particular VM. Operation 1405 is executed to identify an accelerator in a queue to process a resource request based upon an accelerator weight. In some example embodiments a weight value is associated to a particular accelerator to denote the ability of accelerator to process certain types of resource requests. For example, an accelerator with a high weight value may have a large number of CPU cycles and memory available to process a particular piece of data provided by a VM. Decisional operation 1406 is illustrated that determines whether the resource request is less than (<) a threshold load with a padding value, As used herein, a threshold load is a limit defining a maximum amount of accelerator resources available to a domain. As used herein, a padding value is a value used to prevent repeated switches (e.g., ping-ponging) between accelerators processing a resource request In cases where decisional operation 1406 evaluates to "false," the operation 1405 is executed. In cases where decisional operation 1406 evaluates to "true" an operation 1407 is executed. Operation 1407 is executed to assign a domain to a particular identify accelerator. As used herein, assigned includes a mapping between a particular domain. and a particular accelerator.

In some example embodiments, load balancing is implemented by the management/driver domain scheduler module 408 to distribute a load (e.g., a resource request) evenly across the available accelerators. As discussed above, a reference counter value is used to determine memory allocated for a domain. In one example embodiment, CUDA™ based function calls such as initialization (e.g., init) and exit from applications (e.g., application 212) get executed by the accelerator backend 209 on behalf of a domain (e.g., VM 207). These routines to maintain a reference count per domain once the domain gets associated with an accelerator and makes a CUDA™ call. Apart from init and exit, the reference count is also incremented by every memory allocation (e.g., CUDA™ malloc 302) on the accelerator and decremented with the corresponding free (e.g., a memory de-allocation function). When a domain has a positive reference counter value, the domain is associated with an accelerator.

Figure 15:
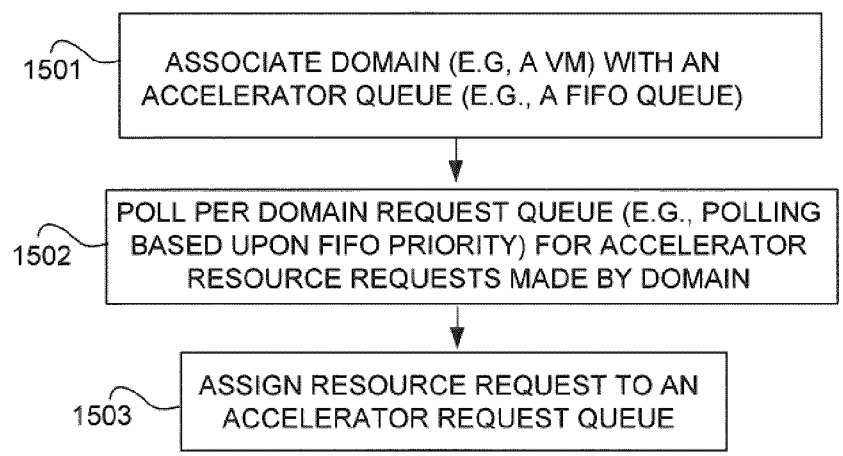
FIG. 15 is a flowchart illustrating the execution of the operation, according to an example embodiment, that facilitates first-come-first serve scheduling.

FIG. 15 is a flowchart illustrating the execution of the operation 1104 in the form. of first come first serve scheduling. Shown is an operation 1501 that associates a domain with an accelerator. Operation 1502 is executed that polls the per domain request queue for accelerator resource requests made by a particular domain. Operation 1503 is shown that is executed to assign the resource requests to a particular accelerator request queue. In accelerator request queue includes resource requests tendered by a particular VM.

Figure 16:
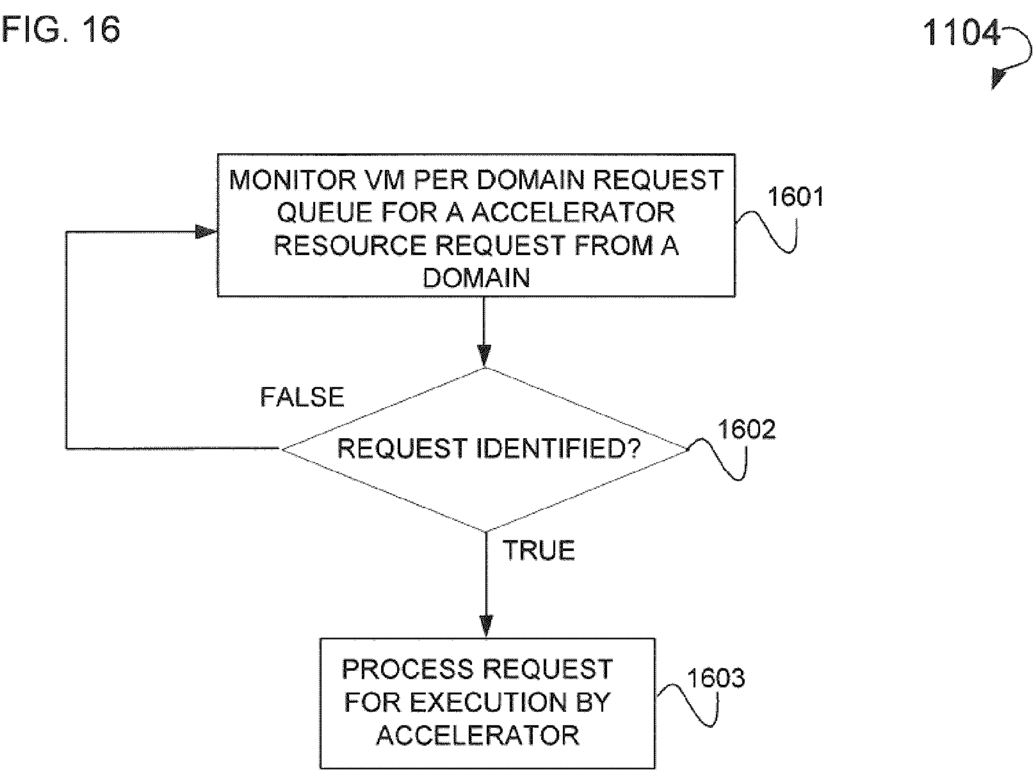
FIG. 16 is a flowchart illustrating the execution of operation, according to an example embodiment, that facilitates round robin scheduling.

FIG. 16 is a flowchart illustrating the execution of operation 1104 in the form of a round robin scheduling. Shown is an operation 1601 that is executed to monitor a VM per domain request queue for resource requests from a particular VM. This monitoring may be performed by the monitor module 409 for some amount of time every time period for each domain in the accelerator queue. Decisional operation 1602 is executed that determines whether the request is identified. In cases where decisional operation 1602 evaluates to "false," the operation 1601 is executed. In cases where decisional operation 1602 evaluates to "true," an operation 1603 is executed. Operation 1603 is executed to process a request for execution by accelerator. This request for execution may include resource requests to be processed by the accelerator.

FIG. 17 is a flowchart illustrating the execution of operation 1104 in the form of management/driver domain credit based scheduling. Shown is an operation 1701 that is executed to identify a domain. Operation 1702 is executed to receive a hypervisor credit for a particular domain. These credits may be in the form of numeric values that are allocated or otherwise assigned to a particular VM to allow this YM to access accelerator resources managed by the hypervisor. In some example embodiments, these credits are assigned to a domain at system boot. Operation 1703 is executed to monitor changes in the number of credits for a particular domain. These changes may include increasing or decreasing of accelerator credits associated with a particular domain. Operation 1704 is executed to identify a backup queue and accelerator queue. Identify may include retrieving a reference to a data structure such as a queue. Operation 1705 is executed to order both the backup queue and the accelerator queue by the number of domain credits. In some example embodiments, domains with a large number of credits are placed at the beginning of the queue, whereas, in other example embodiments, domains with a few number of credits are replaced at the beginning of the queue. As used herein, a large number of credits is determined relative to another domain and the credits associated therewith. Operation 1706 is executed to identify a time increment (e.g., "T"), a current time ("TC"), and a maximum time (e.g., "TM") for a domain. Operation. 1707 is executed to determine the quotient of the sum of the current and maximum times (e.g., "TC +TM") as divided by the minimum system credits. As used herein, a minimum system credit is an increment of time (e.g., "T"). A decisional operation 1708 is shown that determines whether the accelerator queue is empty. Empty is used herein may include a null value. In cases where decisional operation 1708 evaluates to "false," an operation 1709 is executed. In cases where decisional operation 1708 evaluates to "true," and operation 1710 is executed. Operation 1709 is executed to put a referent (e.g., a pointer) to a domain object into the backup queue. Operation 1710 is executed to put a referent to a domain object into the accelerator queue.

In some example embodiments, a domain is assigned a credit which is intended to provide QoS guarantees to the domain. In one example embodiment, credits are used to calculate the proportion of time a domain call buffer is monitored. The higher the credits, the more time is given for the execution of domain resource requests on an accelerator. The point worth highlighting here is the adaptation to the GPU nature inherent in the algorithm. In some example embodiments, once a compute kernel is launched on an accelerator, the accelerator does not get preempted. Specifically, requests from a domain that is at the head of the queue are handled until all resource requests from this domain are processed based upon the number of "T" values or credits assigned to the domain. Domains that have run for their quota of time for a current period are placed into the backup domain. The domains are also moved to the backup queue irrespective of their remaining time, if there are no requests from them. Such domains are immediately moved back in the accelerator queue when some request is received from them.

Figure 18:
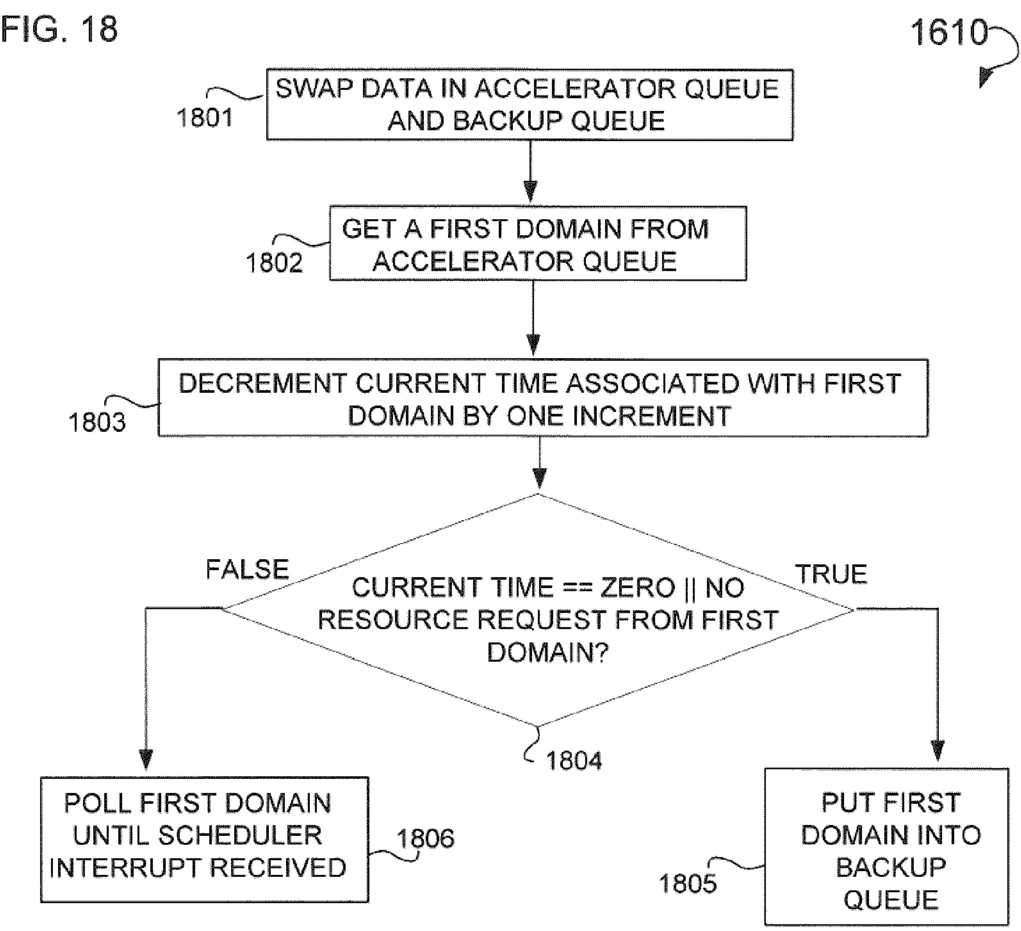
FIG. 18 is a flowchart illustrating the execution operation, according to an example embodiment, to put the resource request into the accelerator queue.
Figure 22:
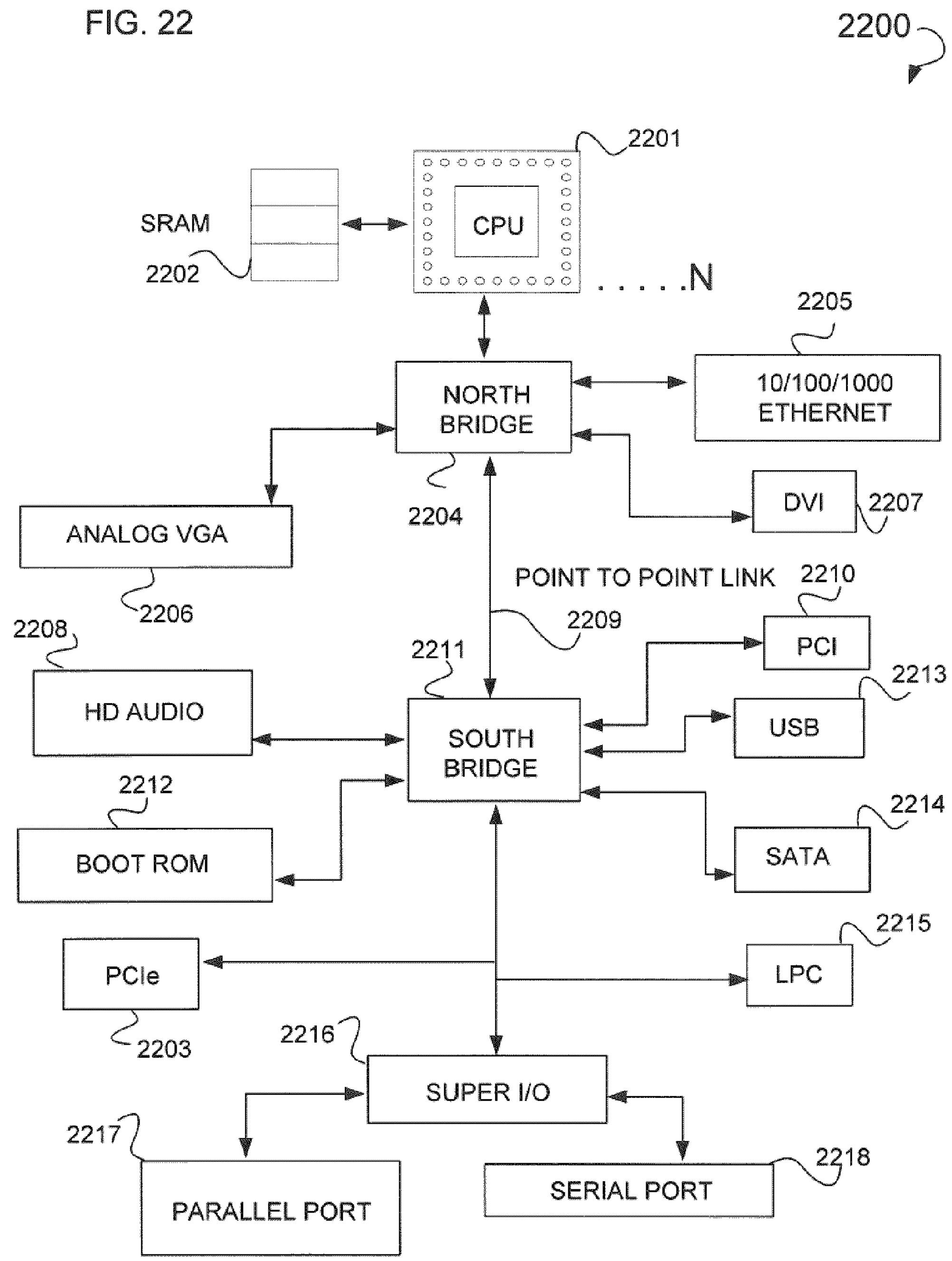
FIG. 22 shows a diagrammatic representation of a machine in the example form of a computer system within which a set of instructions for causing the machine to perform any one or more of the methodologies discussed herein may be executed.

FIG. 18 is a flowchart illustrating the execution operation 1610. Shown is an operation 1801 that is executed to swap data in the accelerator queue and the backup queue. Operation 1802 is executed to get the first domain from the accelerator queue. As used herein, get includes retrieving a data structure such as a structure (e.g., a struct.) or object from the accelerator queue. This structure or object may have, for example, one of the functions 302-306 associated with it. Operation 1803 is executed to decrement a "TC" value associated with the first domain by one increment. The "TC" value may be associated with the first domain as a structure property, an object attribute, or some other suitable value associated with the domain. A decisional operation 1804 is shown that determines whether the current time equals zero, or if no resources request has been received from the first domain. In cases where decisional operation 1804 evaluates to "true" an operation 1805 is executed. In cases where decisional operation 1804 evaluates to "false," an operation 1806 is executed. Operation 1805 is executed to put the first domain into the backup queue. Operation 1806, when executed, polls the first domain until a scheduler interrupt is received. Schedule interrupt may include some type of interrupt such as a semaphore, lock, spinlock or some other suitable lock that facilitates an interrupt of a particular program.

FIG. 19 is a flowchart illustrating the execution of operation 1104 in the form of accelerator credit based scheduling. Shown is an operation 1901 that identifies a domain. Operation 1902 is executed to retrieve accelerator credit for the identified domain. In some example embodiments, these accelerator credits are determined based on static profiles gathered by running the guest application (e.g., the application 212) without virtualization to determine the proportion of time the guest application expects on the accelerator versus the general purpose cores, or from application hints (e.g., predefined application execution parameters). Additionally, the accelerator credits may be acquired by recording the previous runtime and resource demands of the application be executed. In some example embodiments, these credits are assigned to domain at system boot. Operation 1903 is executed to monitor changes in a number of accelerator credits for the domain. Operation 1904 is executed to identify a backup queue and accelerator queue. Operation 1905 is executed to order both the backup queue and the accelerator queue by the number of domain accelerator credits. Ordering, as used herein, may include ordering from largest to smallest, or from smallest to largest within the queue, Operation 1906 is executed to identify a "T" value, a "TC" value, and a "TM" value. Operation 1907 is executed to determine the quotient of the sum of "TC" and "TM," as divided by the minimum system credits. A decisional operation 1908 is shown that determines whether the accelerator queue is empty. In cases where decisional operation 1908 evaluates to "false," the operation 1909 is executed. In cases where decisional operation 1908 evaluates to "true," operation 1910 is executed. Operation 1909, when executed, puts the domain resource request into the backup queue. Operation 1910, when executed, puts the domain resource request into the accelerator queue.

FIG. 20 is a flowchart illustrating execution of operation 1104 that implements SLA based feedback based scheduling. Shown is an operation 2001 that is executed to start the poller 407 and the management/driver domain scheduler module 408 to complete a set up. An operation 2002 is executed to implement admission control. This operation 2002 may be executed by the admission control module 402. In some example embodiments, the operation 2002 is executed to receive an SLA from a new domain. A decisional operation 2004 is executed to determine whether there are enough accelerator resources to process a particular resource request. In cases where decisional operation 2004 evaluates to "false," an operation 2005 is executed. In cases where decisional operation 2004 evaluates to "true," an operation 2006 is executed. Operation 2005 is executed to generate a refuse access message and provide this message as feedback to the requesting domain. Feedback, as used herein, may be a flag or bit value. Operation 2006 is executed to get a credit for a domain, and to calculated "T" values (e.g., ticks) for which to poll. Operation 2007 is executed to add a domain to a queue, wherein the queue may be the backup queue 404. Operation 2008 is executed to assign a no context established value to a state variable. A no context established value, as used herein, may be a boolean used to denote that a context has not been initiated for an accelerator. Operation 2009 is executed to poll for specific requests for the accelerator resources.

In some example embodiments, decisional operation 2010 is executed to determine whether a context shift has occurred for a particular OS in the form of a VM. In cases where decisional operation 2010 evaluates to "false," the operation 2008 is executed. In cases where decisional operation 2010 evaluates to "true," operation 2011 is executed. Operation 2011, when executed, assigns a "contexttesttb" value to a domain state variable. The "contexttesttb" value includes a value based upon polling a domain for assigned "T" values as denoted by an average as dictated by an SLA. In some example embodiments, feedback (see e.g., monitor 409) may be provided to the operation 2011 such that if resources are not available, additional "T" values are allocated to a domain. Decisional operation 2012 is executed to determine whether or not the current SLA for a domain has been met. In cases where decisional operation 2012 evaluates to "false," an operation 2013 is executed. In cases where decisional operation 2012 evaluates to "true," operation 2014 is executed. Operation 2013 is executed to increase "T" values for a domain, or to add a penalty value (e.g., decrement "T") to the "T" value for the domain. Operation 2014 is executed to check if the "T" value can be reduced. An operation 2015 is executed to check the next domain state, and assign a ready state to domain state.

FIG. 21 is a flowchart illustrating execution of operation 1104 that implements management and hypervisor based co-scheduling. Shown is operation 2101 that is executed to setup a channel between the management/driver domain and a scheduler. Operation 2102 is executed, by for example the admission control module 402, to facilitate admission control for resource requests. Operation 2103 is executed to get credits for the domain after the domain gets addition calculated "T" values (e.g., ticks) for which to poll. Operation 2104 is executed to add a domain to a queue, wherein the queue may be the backup queue 404. Further, an operation 2108 is executed that receives a scheduling period for CPUs associated with the general purpose cores 202. Additionally, the operation 206, when executed, may get the domains scheduled and "T" value assigned to the CPUs from the hypervisor scheduler 411. Operation 2109 is executed to calculate corresponding "T" values for each domain. Decisional operation 2105 is executed to determine whether a context has been set. In cases where decisional operation 2105 evaluates to "false," an operation 2106 is executed. In cases where decisional operation 2105 evaluates to "true," an operation 2107 is executed. Operation 2106 is executed to ignore co-domain scheduling. Operation 2107 is executed to generate a temporary increase in "T" that is associated with a particular domain so as to just to keep position of this domain within a queue. The queue may be the per-domain request queue 405. Operation 2110 is executed to continue execution of the accelerator. Operation 2111 is executed to translate "T" associated with accelerator credits to "T" associated with a CPU credits. This CPU may include the general purpose cores 202. Operation 2112 is executed to decrement CPU credits for a period.

FIG, 22 is a diagram of an example computer system 2200. Shown is a CPU 2201. The processor die 201 may be a CPU 2201, In some example embodiments, a plurality of CPUs may be implemented on the computer system 2200 in the form of a plurality of cores (e.g., a multi-core computer system), or in some other suitable configuration. Some example CPUs include the x86 series CPU. Operatively connected to the CPU 2201 is Static Random Access Memory (SRAM) 2202. Operatively connected includes a physical or logical. connection such as, for example, a point to point connection, an optical connection, a bus connection or some other suitable connection. A North Bridge 2204 is shown, also known as a Memory Controller Hub (MCH), or an Integrated Memory Controller (IMC), that handles communication between the CPU and PCIe, Dynamic Random Access Memory (DRAM), and the South Bridge. An ethernet port 2205 is shown that is operatively connected to the North Bridge 2204. A Digital Visual Interface (DVI) port 2207 is shown that is operatively connected to the North Bridge 2204. Additionally, an analog Video Graphics Array (VGA) port 2206 is shown that is operatively connected to the North Bridge 2204. Connecting the North Bridge 2204 and the South Bridge 2211 is a point to point link 2209. In some example embodiments, the point to point link 2209 is replaced with one of the above referenced physical or logical connections. A South Bridge 2211, also known as an I/0 Controller Hub (ICH) or a Platform Controller Hub (PCH), is also illustrated. A PCIe port 2203 is shown that provides a computer expansion port for connection to graphics cards and associated GPUs. Operatively connected to the South Bridge 2211 are a High Definition (HD) audio port 2208, boot RAM port 2212, PCI port 2210, Universal Serial Bus (USB) port 2213, a port for a Serial Advanced Technology Attachment (SATA) 2214, and a port for a Low Pin Count (LCP) bus 2215. Operatively connected to the South Bridge 2211 is a Super Input/Output (I/0) controller 2216 to provide an interface for low-bandwidth devices (e.g., keyboard, mouse, serial ports, parallel ports, disk controllers). Operatively connected to the Super I/O controller 2216 is a parallel port 2217, and a serial port 2218.

The SATA port 2214 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 2202 and/or within the CPU 2201 during execution thereof by the computer system 2200. The instructions may further be transmitted or received over the 10/100/1000 ethernet port 2205, USB port 2213 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:

a processor;

a memory;

an admission control module, that resides in a management/driver domain in a hypervisor layer and is operatively connected to the processor and the memory, the admission control module to admit a domain, that is part of a plurality of domains, into the computer system based upon one of a plurality of accelerators satisfying a resource request of the domain, the plurality of accelerators connected to a plurality of general purpose cores in a physical layer in the computer system;

a load balancer module, that resides in the management/driver domain in the hypervisor layer and is operatively connected to the processor and the memory, the load balancer to balance at least one load from the plurality of domains across the plurality of accelerators; and a scheduler module, that resides in the management/driver domain in the hypervisor layer and is operatively connected to the processor and the memory, the scheduler to multiplex multiple requests from the plurality of domains to one of the plurality of accelerators.

2. The computer system of claim 1, wherein the domain is a Virtual Machine (VM).

3. The computer system of claim 1, wherein the accelerator includes at least one of an accelerator Central Processing Unit (CPU), a Graphical Processing Unit (GPU), a cryptographic accelerator, on-chip accelerator, or a network accelerator.

4. The computer system of claim 1, wherein the scheduler module is instructed by a Service Level Agreement (SLA) that dictates a Quality of Service (QoS) that the domain is to receive from the at least one accelerator of the plurality of accelerators.

5. The computer system of claim 4, wherein the SLA comprises data related resources including at least one of accelerator Central Processing Unit (CPU) cycles, Graphical Processing Unit (GPU) cycles, memory availability, or memory bandwidth.

6. The computer system of claim 1, wherein the scheduler module is operatively connected to a hypervisor scheduler.

7. A computer implemented method in a computer system comprising:

getting an accelerator profile, using an admission control module residing in a management/driver domain in a hvpervisor laver, the accelerator profile identifying an accelerator resource to allocate to a Virtual Machine (VM) from a plurality of virtual machines executing on the computer system, the accelerator resource connected to a general purpose core in the computer system, wherein a plurality of accelerator resources are connected to a plurality of general purpose cores in a physical layer in the computer system;

determining an accelerator type based upon the accelerator profile, using the admission control module, to match a resource request of the VM to the accelerator resource;

storing the accelerator type, using the admission control module, to a list of accelerators that match the resource request, wherein the list of accelerators is organized by weights based on the capabilities of accelerator hardware resources;

checking a current load, using a load balancing module residing in the management/driver domain in the hvpervisor layer, to load balance at least one load from the plurality of VMs across the accelerator resources in the list of accelerators; and identifying an accelerator resource, using a management/driver domain scheduler module residing in the management/driver domain in the hvpervisor layer, in the list of accelerators that can multiplex the resource request of the VM and resource requests of other virtual machines.

8. The computer implemented method of claim 7, further comprising getting a VM resource profile, using the admission control module, that represents a desired Service Level Agreement (SLA) for the VM; and admitting the VM to access the accelerator resource, using the admission control module, the admission made where an amount of accelerator resources available are equal or more than required by the VM based upon the VM resource profile.

9. The computer implemented method of claim 7, further comprising issuing a request, using a poller module, to the identified accelerator to process the accelerator resource request of the VM.

10. The computer implemented method of claim 7, further comprising:

associating the VM with an accelerator in an accelerator memory, using the management/driver domain scheduler module, the accelerator memory allocated to the VM; and storing the resource request of the VM into a data structure associated with the accelerator memory.

11. The computer implemented method of claim 10, further comprising:

determining, using a monitor module, that a load on the accelerator is greater than a threshold value associated with the accelerator; and migrating an additional resource request, using the load balancing module, to an additional accelerator to process the additional resource request, the additional accelerator selected based upon an accelerator weight associated with the additional accelerator.

12. The computer implemented method of claim 7, wherein the resource request includes a function call to utilize the accelerator resource.

13. The computer implemented method of claim 7, wherein the list is a priority queue.

* * * * *